United States Patent
Bourns et al.

(10) Patent No.: US 10,439,196 B2
(45) Date of Patent: Oct. 8, 2019

(54) ELECTROMECHANICAL CIRCUIT BREAKER

(71) Applicant: BOURNS, INC., Riverside, CA (US)

(72) Inventors: Gordon Lee Bourns, Riverside, CA (US); Lars Erik Gunnar Meijer, Orange, CA (US); Earl Robert Gellings, Moreno Valley, CA (US); Kiyoshi Tada, Yokohama (JP)

(73) Assignee: BOURNS, INC., Riverside, CA (US)

( * ) Notice: Subject to any disclaimer, the term of this patent is extended or adjusted under 35 U.S.C. 154(b) by 442 days.

(21) Appl. No.: 15/379,070

(22) Filed: Dec. 14, 2016

(65) Prior Publication Data

US 2017/0179713 A1 Jun. 22, 2017

Related U.S. Application Data

(60) Provisional application No. 62/269,420, filed on Dec. 18, 2018, provisional application No. 62/331,756, filed on May 4, 2016.

(51) Int. Cl.
*H01M 2/34* (2006.01)
*H02H 9/02* (2006.01)
(Continued)

(52) U.S. Cl.
CPC ......... *H01M 2/348* (2013.01); *H01M 2/1016* (2013.01); *H01M 2/1077* (2013.01);
(Continued)

(58) Field of Classification Search
CPC .. H01M 2/348; H01M 2/1016; H01M 2/1077; H01M 2/202; H02H 9/026
See application file for complete search history.

(56) References Cited

U.S. PATENT DOCUMENTS

| | | |
|---|---|---|
| 3,361,888 A | 1/1968 | Brackett |
| 3,840,834 A | 10/1974 | Obenhaus et al. |

(Continued)

FOREIGN PATENT DOCUMENTS

| | | |
|---|---|---|
| CN | 201315331 Y | 9/2009 |
| CN | 206211588 U | 5/2017 |

(Continued)

OTHER PUBLICATIONS

Office Action dated Aug. 8, 2018 for U.S. Appl. No. 15/379,193, 25 pages.

(Continued)

*Primary Examiner* — Scott Bauer
(74) *Attorney, Agent, or Firm* — Knobbe, Martens, Olson & Bear LLP

(57) ABSTRACT

An electrical breaker responsive to a fault condition is disclosed. A thermally-activated switch can be disposed between a first terminal and second and third terminals of the breaker. The switch can have a normal operating condition in which the first terminal is electrically connected to the second terminal. The switch can have a fault condition in which the first terminal is electrically connected to both the second terminal and the third terminal, causing a majority of the current to flow between the first terminal and the third terminal and a minority of the current to flow between the first terminal and the second terminal. The breaker can include a positive temperature coefficient (PTC) resistor between the first terminal and one of the second and third terminals. The thermally-activated switch can be integrated into a variety of structures, for example, a battery pack which can house one or more cells.

29 Claims, 15 Drawing Sheets

(51) Int. Cl.
*H01M 2/10* (2006.01)
*H01M 2/20* (2006.01)
*H01M 10/42* (2006.01)
*H02H 7/18* (2006.01)
*H01M 2/30* (2006.01)

(52) U.S. Cl.
CPC ........... *H01M 2/202* (2013.01); *H01M 2/206* (2013.01); *H01M 10/4235* (2013.01); *H02H 7/18* (2013.01); *H02H 9/026* (2013.01); *H01M 2/30* (2013.01); *H01M 2200/106* (2013.01); *H01M 2220/20* (2013.01); *H01M 2220/30* (2013.01)

(56) References Cited

U.S. PATENT DOCUMENTS

| | | | |
|---|---|---|---|
| 4,518,943 A | 5/1985 | Giessner | |
| 5,104,754 A | 4/1992 | Dorinski et al. | |
| 5,337,036 A | 8/1994 | Kuczynski | |
| 5,459,388 A | 10/1995 | Illingworth et al. | |
| 5,666,254 A * | 9/1997 | Thomas | H02H 9/026 361/8 |
| 5,689,173 A * | 11/1997 | Oosaki | H01M 2/105 320/154 |
| 5,864,458 A * | 1/1999 | Duffy | C11D 11/0082 361/93.9 |
| 5,886,860 A | 3/1999 | Chen et al. | |
| 5,995,392 A * | 11/1999 | Turner | H02H 9/001 323/908 |
| 6,128,168 A | 10/2000 | Arnold et al. | |
| 6,346,796 B1 | 2/2002 | Takeda | |
| 6,469,600 B1 | 10/2002 | Seese et al. | |
| 6,503,647 B1 | 1/2003 | Sugiyama et al. | |
| 6,633,222 B2 | 10/2003 | Nagai et al. | |
| 6,756,876 B2 | 6/2004 | Sullivan et al. | |
| 6,801,116 B2 | 10/2004 | Oh et al. | |
| 6,861,930 B2 | 3/2005 | Simms et al. | |
| 7,113,381 B2 * | 9/2006 | Francis | H01C 1/1406 361/106 |
| 7,205,067 B2 | 4/2007 | Godevais et al. | |
| 7,354,677 B2 | 4/2008 | Yoshizawa et al. | |
| 7,446,643 B2 | 11/2008 | Lee et al. | |
| 7,618,724 B2 | 11/2009 | Kim et al. | |
| 8,958,196 B2 | 2/2015 | Takeda | |
| 9,350,053 B2 | 5/2016 | Feuerstack et al. | |
| 9,923,362 B2 * | 3/2018 | Hasunuma | H01C 7/02 |
| 9,960,545 B2 | 5/2018 | Golubovic et al. | |
| 2002/0140401 A1 | 10/2002 | Watanabe et al. | |
| 2004/0065536 A1 | 4/2004 | Takiagwa | |
| 2005/0057336 A1 | 3/2005 | Toyosaki et al. | |
| 2006/0017738 A1 | 1/2006 | Bystricky et al. | |
| 2006/0109074 A1 * | 5/2006 | Lee | H01H 1/504 337/167 |
| 2009/0253028 A1 | 10/2009 | Takagi | |
| 2010/0165526 A1 * | 7/2010 | Dishman | H02H 9/026 361/58 |
| 2011/0043321 A1 | 2/2011 | Takeda | |
| 2011/0293997 A1 | 12/2011 | Tartaglia | |
| 2012/0212210 A1 | 8/2012 | Takeda | |
| 2013/0136964 A1 | 5/2013 | Li et al. | |
| 2013/0323547 A1 | 12/2013 | Namikawa | |
| 2014/0078632 A1 | 3/2014 | Jung | |
| 2014/0103880 A1 | 4/2014 | Schaefer et al. | |
| 2015/0037626 A1 | 2/2015 | Malcolm et al. | |
| 2015/0188204 A1 | 7/2015 | Hanada | |
| 2015/0229011 A1 | 8/2015 | Gless | |
| 2015/0244165 A1 | 8/2015 | Roesner et al. | |
| 2015/0288025 A1 | 10/2015 | Hwang et al. | |
| 2015/0291019 A1 | 10/2015 | Hatta et al. | |

FOREIGN PATENT DOCUMENTS

| | | |
|---|---|---|
| DE | 10 2014 215 550 A1 | 2/2016 |
| EP | 2 456 003 A1 | 5/2012 |
| EP | 2 541 576 A1 | 1/2013 |
| JP | 2005-203277 | 7/2005 |
| JP | 2006-156064 | 6/2006 |
| JP | 2007-043800 | 2/2007 |
| JP | 2011-198645 | 10/2011 |
| JP | 2011-249322 | 12/2011 |
| JP | 2012-059369 | 3/2012 |
| JP | 2012-084548 | 4/2012 |
| JP | 4980495 | 7/2012 |
| JP | 2012-160317 | 8/2012 |
| JP | 2012-160375 | 8/2012 |
| JP | 2012-174615 | 9/2012 |
| JP | 2012-238615 | 12/2012 |
| JP | 2013-016510 | 1/2013 |
| JP | 2013-020771 | 1/2013 |
| JP | 2013-020864 | 1/2013 |
| JP | 2013-041798 | 2/2013 |
| JP | 5148023 | 2/2013 |
| JP | 2013-062256 | 4/2013 |
| JP | 2013-093143 | 5/2013 |
| JP | 2013-098096 | 5/2013 |
| JP | 2013-110032 | 6/2013 |
| JP | 2013-110034 | 6/2013 |
| JP | 2013-127870 | 6/2013 |
| JP | 2013-140819 | 7/2013 |
| JP | 2013-149632 | 8/2013 |
| JP | 2013-161683 | 8/2013 |
| JP | 2013-161763 | 8/2013 |
| JP | 2013-171642 | 9/2013 |
| JP | 2013-186953 | 9/2013 |
| JP | 2013-222533 | 10/2013 |
| JP | 2017-139104 | 8/2017 |
| WO | WO 2005/124807 A1 | 12/2005 |
| WO | WO 2006/086156 A2 | 8/2006 |
| WO | WO 2012/094385 A2 | 7/2012 |
| WO | WO 2012/169442 A1 | 12/2012 |
| WO | WO 2013/054927 A1 | 4/2013 |
| WO | WO 2013/094725 A1 | 6/2013 |
| WO | WO 2014/177874 A2 | 11/2014 |
| WO | WO 2014/189363 A1 | 11/2014 |
| WO | WO 2015/157106 A1 | 10/2015 |
| WO | WO 2016/000492 A1 | 1/2016 |
| WO | WO 2017/198599 A1 | 11/2017 |

OTHER PUBLICATIONS

Ji, Yan et al., "Heating strategies for Li-ion batteries operated from subzero temperatures," Electrochimica Acta, 2013, vol. 107, pp. 664-674.

International Search Report and Written Opinion dated May 5, 2017 in International Application No. PCT/US16/66985, 15 pages.

Supplemental European Search Report, completed Jun. 26, 2019, for European Appl. No. EP 16 87 6703, 6 pages.

* cited by examiner

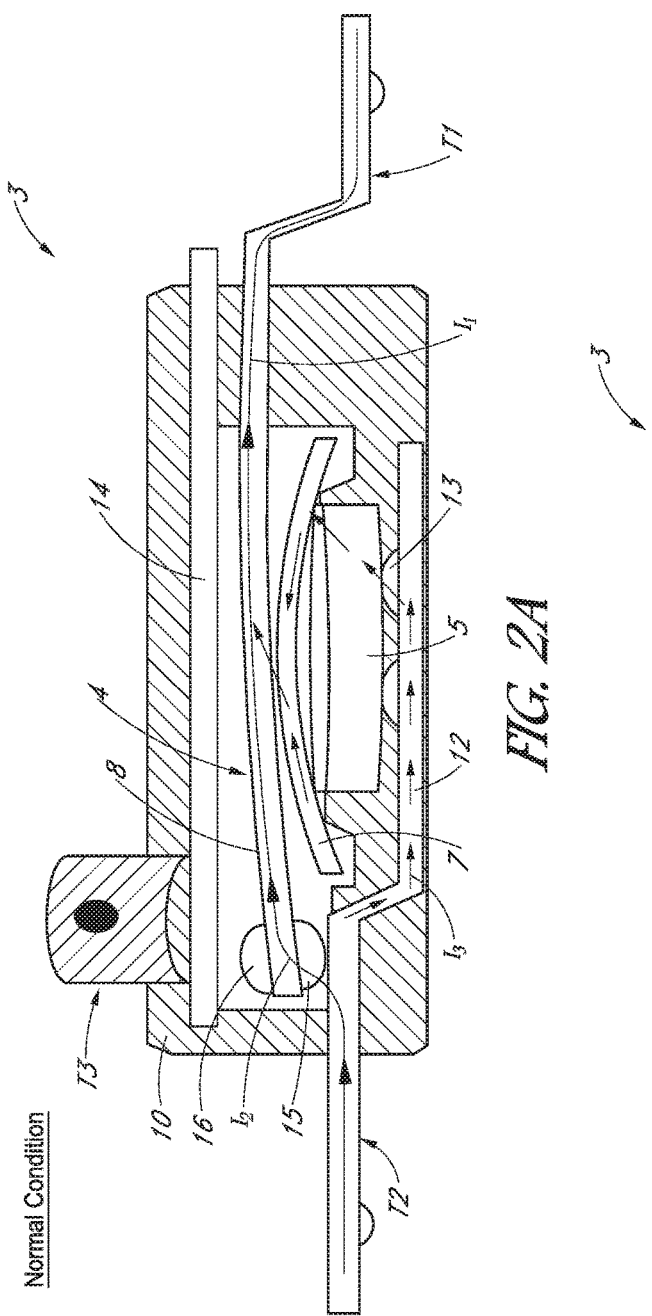
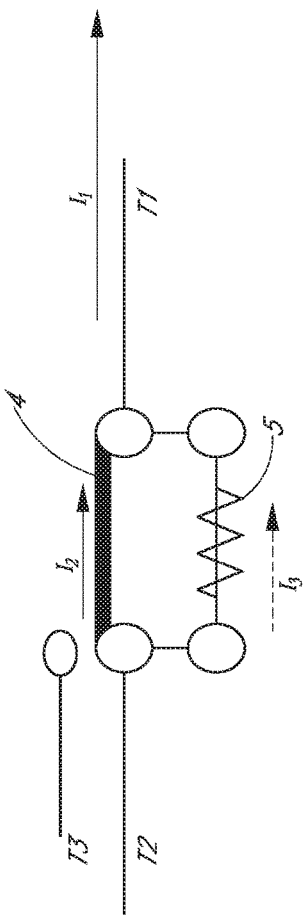
FIG. 2A
FIG. 2B

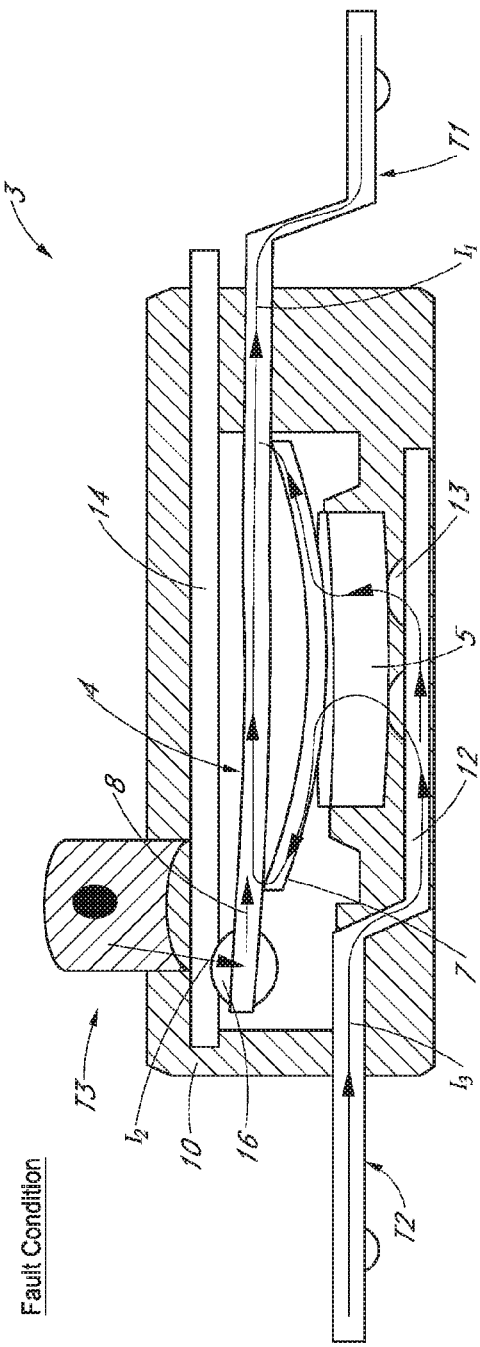
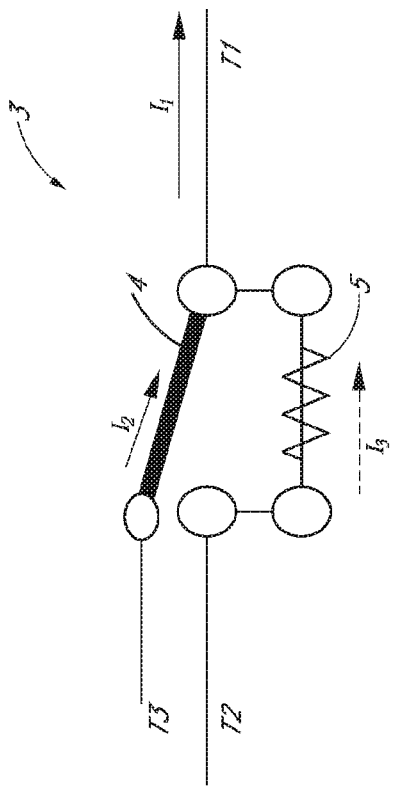
FIG. 3A
FIG. 3B

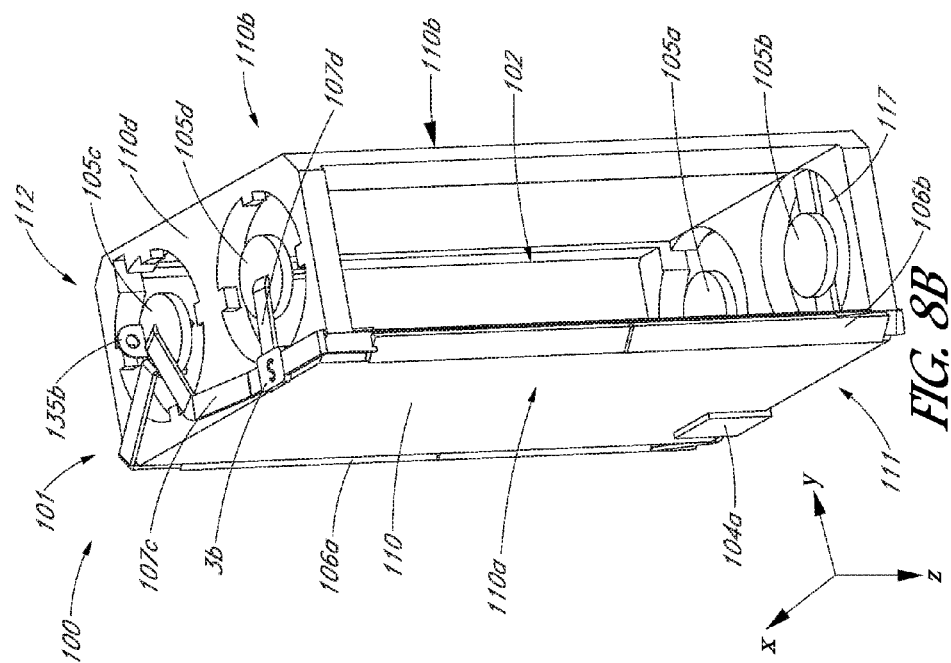
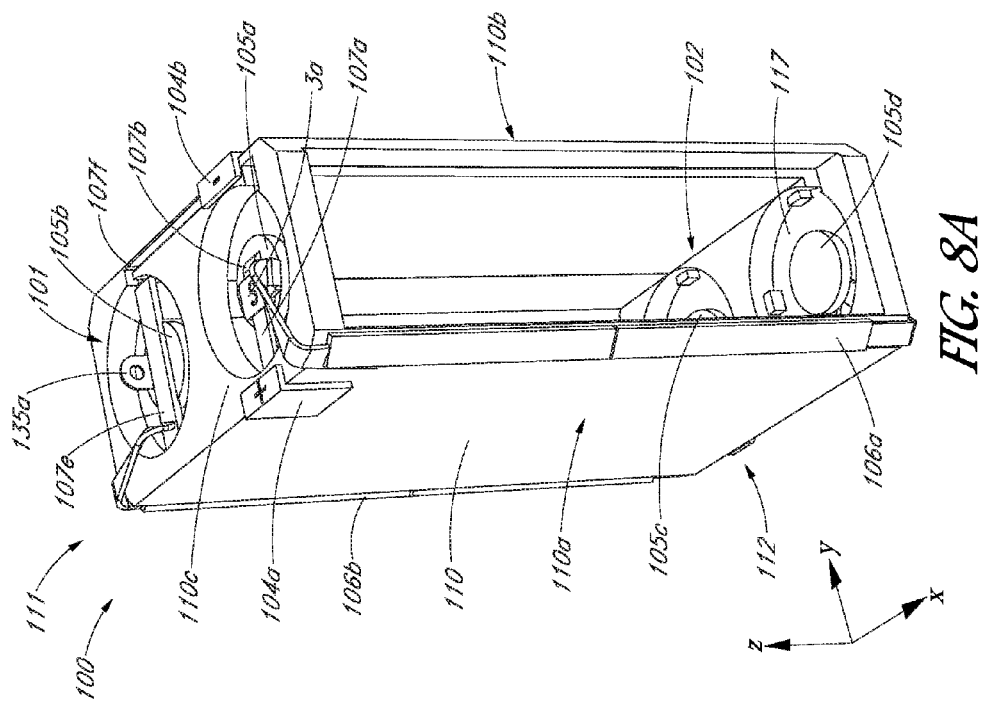

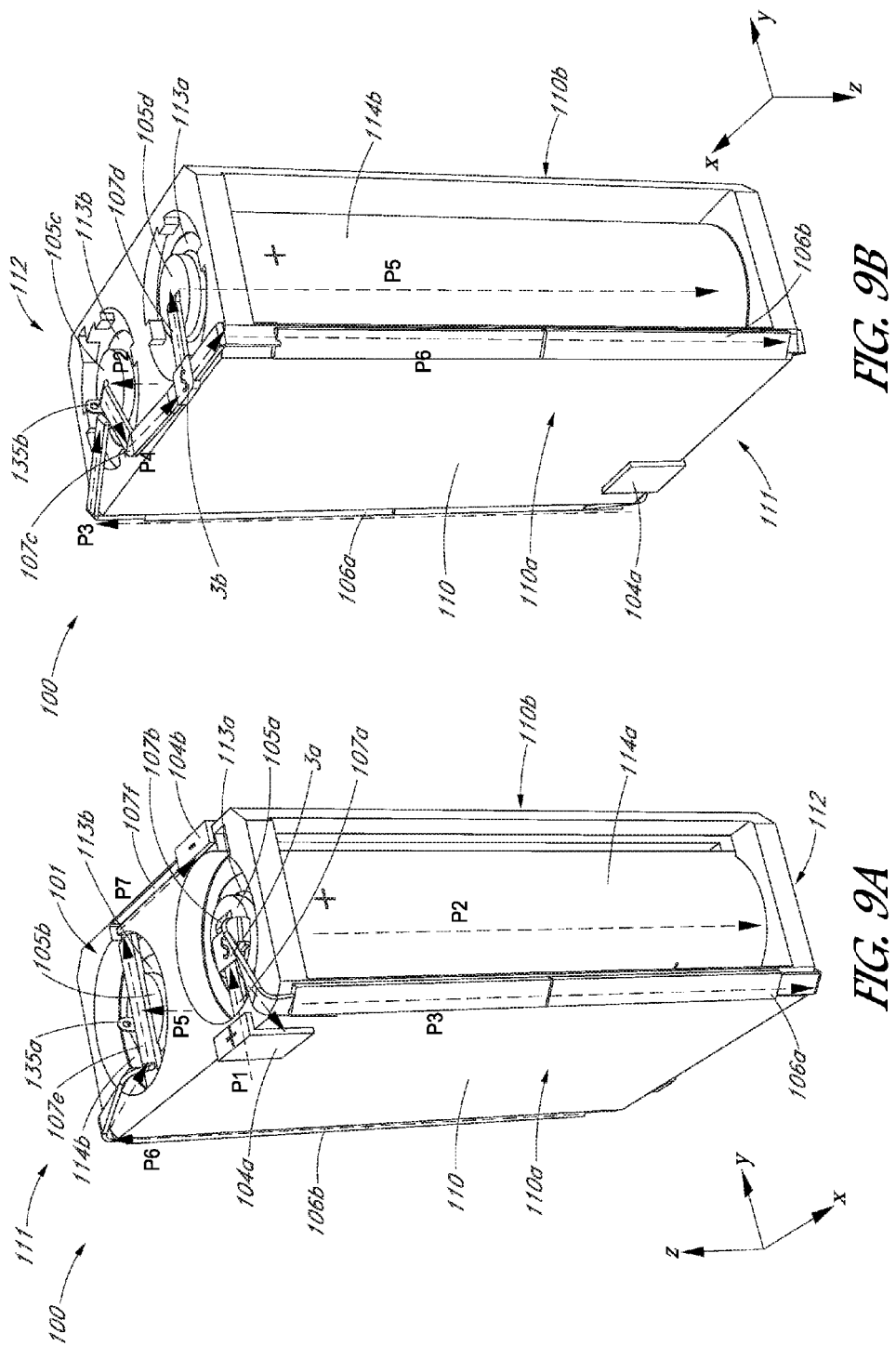

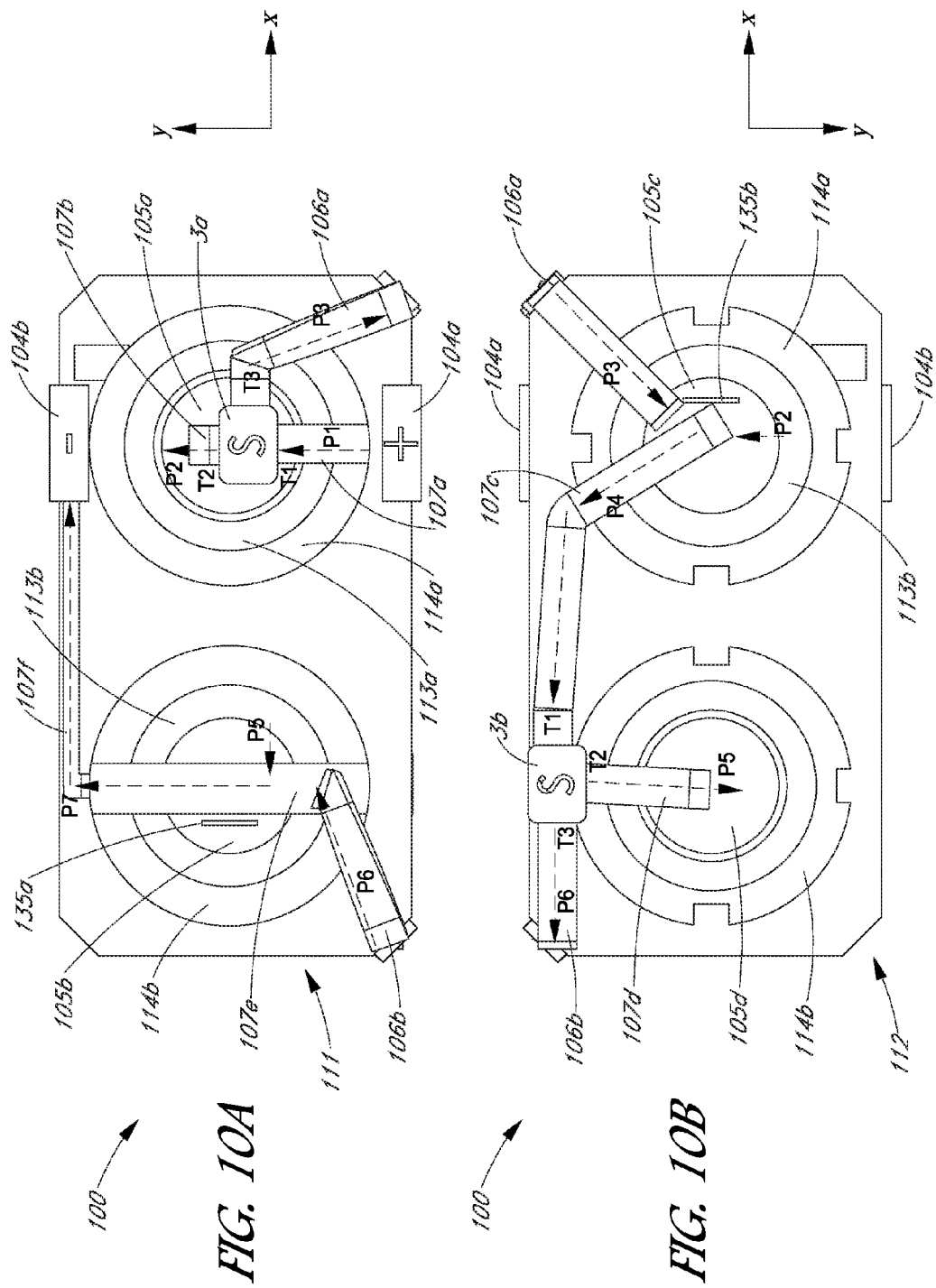

ELECTROMECHANICAL CIRCUIT BREAKER

CROSS-REFERENCE TO RELATED APPLICATIONS

This application claims priority to U.S. Provisional Patent Application Nos. 62/269,420 and 62/331,756, the entire disclosures of which are incorporated by reference herein in their entirety and for all purposes.

BACKGROUND

Field of the Invention

The field relates generally to an electromechanical circuit breaker, and in particular, to a three-terminal breaker, and an electrical system incorporating such a three-terminal breaker.

Description of the Related Art

In various types of electrical devices, circuit elements such as batteries, which may comprise one or more cells, or other components may experience faults which negatively affect the operation or reliability of the larger electrical device. For example, the circuit elements can become overheated and/or may experience overcurrent faults in which excessive electrical current passes through the circuit element. Such overtemperature and/or overcurrent faults may reduce the functionality, reliability, lifetime, and/or safety of the device. Accordingly, there remains a continuing need for an apparatus that protects the larger electrical device when circuit elements (such as batteries) experience overtemperature and/or overcurrent faults during operation.

SUMMARY

In one embodiment, an electrical breaker responsive to a fault condition, is disclosed. The breaker can include a first terminal, a second terminal, and a third terminal. The breaker can also include a thermally-activated switch disposed between the first terminal and the second and third terminals. The switch can have a normal operating condition in which the first terminal is electrically connected to the second terminal. The switch can have a fault condition in which the first terminal is electrically connected to both the second terminal and to the third terminal, such that in a fault condition, a majority of the current flows between the first terminal and the third terminal and a minority of the current flows between the first terminal and the second terminal.

In some embodiments, the breaker can include a positive temperature coefficient (PTC) resistor between the first terminal and the second terminal. The thermally-activated switch can comprise a bimetal switching element in contact with the PTC resistor. The bimetal switching element can be dome-shaped. The thermally-activated switch can comprise a movable arm electrically connected to the first terminal and to the bimetal switching element. The movable arm can be electrically connected to the second terminal when the switch is in the normal operating condition. The bimetal switching element can invert in shape as the switch moves from the normal operating condition to the fault condition. Inversion of the bimetal switching element can cause the movable arm to pivot or bend to electrically connect to the third terminal. The switch can be configured to move from the normal operating condition to the fault condition when a temperature of the thermally-activated switch rises above a first threshold temperature. The switch can be configured to return to the normal operating condition from the fault condition when the temperature of the thermally-activated switch falls below a second threshold temperature, the second threshold temperature lower than the first threshold temperature. The first threshold temperature can be in a range of 65° C. to 85° C. The first threshold temperature can be in a range of 70° C. to 80° C. The second threshold temperature can be in a range of 30° C. to 60° C. The second threshold temperature can be in a range of 40° C. to 55° C. The switch can be configured such that, after the switch moves from the normal operating condition to the fault condition, the switch does not automatically move back to the normal operating condition. The PTC resistor can be disposed between the first terminal and the second terminal. The PTC resistor can comprise a ceramic PTC resistor.

In another embodiment, a device is disclosed. The device can include a plurality of battery cells connected to one another in series, each battery cell of the plurality of battery cells having a first battery cell terminal and a second battery cell terminal. The device can include an electrical breaker connected to the first battery cell terminal of a selected battery cell of the plurality of battery cells. The electrical breaker can include a first terminal, a second terminal, and a third terminal. The breaker can include a switch (e.g., a thermally-activated switch) disposed between the first terminal and the second and third terminals. The switch can have a normal operating condition in which the first terminal is electrically connected to the second terminal. The switch can have a fault condition in which the first terminal is electrically connected to both the second terminal and the third terminal. The device can include a bypass circuit electrically connecting the third terminal with the second battery cell terminal of the selected battery cell, such that in a fault condition, a majority of the current flows between the first terminal and the third terminal to provide a shunt around the selected battery cell, and a minority of the current flows between the first terminal and the second terminal.

In some embodiments, the device can include a positive temperature coefficient (PTC) resistor between the first terminal and the second terminal. The thermally-activated switch can include a bimetal switching element. The switch can be configured to move from the normal operating condition to the fault condition when a temperature of the thermally-activated switch rises above a first threshold temperature. The switch can be configured to return to the normal operating condition from the fault condition when the temperature of the thermally-activated switch falls below a second threshold temperature, the second threshold temperature lower than the first threshold temperature. The first threshold temperature can be in a range of 65° C. to 85° C. The first threshold temperature can be in a range of 70° C. to 80° C. The second threshold temperature can be in a range of 30° C. to 60° C. The second threshold temperature can be in a range of 40° C. to 55° C. The switch can be configured such that, after the switch moves from the normal operating condition to the fault condition, the switch cannot move back to the normal operating condition.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Specific implementations of the invention will now be described with reference to the following drawings, which are provided by way of example, and not limitation.

FIG. 2A is a schematic side sectional view of an electrical breaker used in the embodiment of FIGS. 1A-1B in a normal operating condition, according to one embodiment.

FIG. 2B is a schematic circuit diagram of the breaker shown in FIG. 2A.

FIG. 3A is a schematic side sectional view of the electrical breaker of FIG. 2A in a fault condition.

FIG. 3B is a schematic circuit diagram of the breaker shown in FIG. 3A.

FIG. 8A is a schematic top, front, and right perspective view of a battery housing incorporating a circuit breaker, according to one embodiment.

FIG. 8B is a schematic, bottom, rear, and left perspective view of the battery housing shown in FIG. 8A.

FIG. 9A is a schematic top, front, and right perspective view of the battery housing shown in FIGS. 8A-8B, with first and second battery cells disposed in the housing.

FIG. 9B is a schematic, bottom, rear, and left perspective view of the battery housing and battery cells of FIG. 9A.

FIG. 10A is a schematic top plan view of the battery housing and battery cells shown in FIGS. 9A-9B.

FIG. 10B is a schematic bottom plan view of the battery housing and battery cells shown in FIGS. 9A-9B and 10A.

DETAILED DESCRIPTION

I. Examples of Three-Terminal Breakers

Figure 1A:
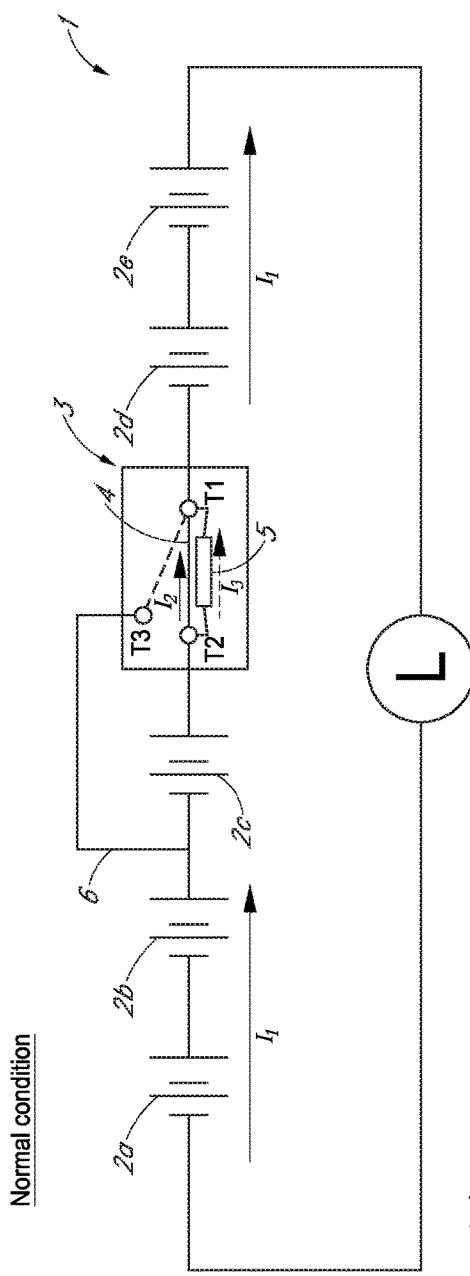
FIG. 1A is a schematic circuit diagram of an electrical system in a normal operating condition, according to one embodiment.

Various embodiments disclosed herein relate to an electromechanical three-terminal breaker for protecting electrical devices from overheating and/or from excessive electrical current. Electrical devices and systems may have numerous circuit elements which can experience fault conditions (e.g., overtemperature and/or overcurrent faults) that can negatively affect the performance or reliability of the entire system. For example, many devices rely on a plurality of batteries or battery cells (whether connected in series, parallel or combinations thereof) to provide power to the electrical system. The batteries are often rechargeable, which enables the user to reuse the battery after discharge instead of purchasing a new battery. For example, mobile electronic devices (such as smartphones, tablet computing devices, laptop computers, etc.) utilize high energy capacity rechargeable batteries (e.g., lithium-ion batteries) to provide power to the electronic device for high performance computing over several hours of operation. Electric bicycles, electric vehicles and hybrid vehicles also rely on high energy capacity batteries to provide sufficient power for operating the vehicle at long driving ranges. Solar power generation systems often use batteries to store energy generated by the solar cells. Skilled artisans will appreciate that there is a continuing demand for reliable and long-lasting batteries for numerous types of electrical systems and devices.

One problem with such battery-powered systems is that one or more battery cells may experience excessive temperatures (overtemperature fault condition) and/or excessive currents (overcurrent fault condition) that can negatively affect the performance, reliability, and/or safety of the entire electrical system. For example, in systems utilizing lithium-ion batteries (e.g., lithium polymer or other types of lithium-ion batteries), cells can experience thermal runaway if a cell becomes sufficiently hot so as to cause the lithium in solution to convert to a solid and short out the lithium layers in the cell. In such situations, the battery can become short circuited and can cause excessive current to flow in the cell, causing the temperature of the cell to rise even more. In some cases, the excessive temperatures can cause the overheated cell to degrade or disrupt the operation of the larger electrical system.

Some types of electromechanical circuit breakers can address overtemperature and/or overcurrent fault conditions by connecting a bimetal switch with a positive temperature coefficient (PTC) resistor, for example, in parallel. A PTC resistor is a resistor in which the resistance increases with increasing temperature, in contrast to conventional resistive materials. In some breakers, if excessive current flows through a particular circuit element, for example a battery, the temperature of the bimetal switch and the PTC resistor increases. At a threshold temperature, the bimetal switch may trip into an inverted position, causing the switch to open. Thus, in a fault condition for such breakers, the open switch may halt or significantly reduce the flow of electrical current through the circuit element to relieve the circuit element of the fault condition. However, in some arrangements, it may be undesirable to stop or significantly reduce the flow of electrical current through the entire circuit. For example, if the circuit element is in series with other circuit elements, then opening the switch of an existing state of the art breaker may cause the flow of electrical current through the other circuit elements to be stopped or be significantly reduced.

To address the effects of overtemperature and/or overcurrent faults in circuit elements while maintaining connectivity with other circuit elements in the system, the embodiments disclosed herein provide a three-terminal breaker which allows current to flow through the circuit element during a normal operating condition, but which bypasses or shunts most (or all) of the current around the problematic circuit element during a fault condition. For example, the breaker can include a first terminal, a second terminal, and a third terminal which can connect to corresponding terminals of the larger electrical system. The breaker can also include a thermally-activated mechanical switch disposed between the first terminal and the second and third terminals. The switch can have a normal operating condition in which the first terminal is electrically connected to the second terminal. The switch can have a fault condition in which the first terminal is electrically connected through a resistor to the second terminal and directly to the third terminal. In some embodiments, the switch can comprise a bimetal element, such as but not limited to a dome-shaped bimetal disc, which can be activated to move the switch from the normal condition to the fault condition, and vice versa. In some embodiments, a positive temperature coefficient (PTC) resistor can be provided between the first terminal and one of the second and third terminals.

FIG. 1A is a schematic circuit diagram of an electrical system 1 in a normal operating condition, according to one embodiment. The electrical system 1 can include a load L and a plurality of battery cells 2a-2e connected in series. It will be understood that the polarity of the series of battery cells may be the opposite of that shown in FIG. 1A, as is the case in all of the figures disclosed herein. The cells 2a-2e can comprise any suitable type of battery cell that provides sufficient power to the load L. For example, in some embodiments, the battery cells 2a-2e can comprise lithium-ion or lithium polymer battery cells. The load L can comprise any suitable type of electrical load, such as components of a mobile device (such as a smartphone, tablet computing device, laptop computer, etc.), components of a vehicle (such as a hybrid or electric vehicle), components of an electrical energy storage system or any other suitable electrical or electronic system. In some embodiments, the battery cells 2a-2e may be used for energy storage in a solar power generation and storage system. It should be appreciated that, although the battery cells 2a-2e are connected in series in the embodiment shown in FIG. 1A, in other arrangements the cells can also be connected in parallel or combinations thereof. Furthermore, although five battery cells 2a-2e are illustrated in FIG. 1A, it should be appreciated that any suitable number of cells may be used.

In FIG. 1A, an electrical breaker 3 is connected to battery cell 2c to protect the circuit from a fault condition. The breaker 3 can comprise a switch 4 connected with a positive temperature coefficient (PTC) resistor 5. In the embodiment of FIG. 1A, for example, the switch 4 is connected in parallel with the PTC resistor, but in other embodiments, the PTC resistor may be connected in other configurations. In the illustrated embodiment, the switch 4 is a thermally-activated mechanical switch, in particular a bimetal element. As explained herein, a PTC resistor 5 can comprise a resistive element with a resistance that increases with increasing temperature. The PTC resistor 5 can be any suitable type of PTC resistor, including a ceramic PTC resistor or a polymeric PTC resistor. Although the breaker 3 is shown as providing protection for the circuit from a fault condition, it should be appreciated that each cell 2a-2e (or any combination thereof) may be connected to its own breaker to provide fault protection. As explained below in connection with FIG. 1A, for example, a bypass circuit 6 can be routed around the cell 2c to divert all or most of the current away from the cell 2c in a fault condition.

The system 1 shown in FIG. 1A is illustrated in a normal operating condition, in which the switch 4 electrically connects a first terminal T1, which can be considered an input terminal, with a second terminal T2, which can be considered a first or primary output terminal. As shown in FIG. 1A, the first terminal T1 is disposed between the switch 4 and the adjacent battery cell 2d. The second terminal T2 is disposed between the switch 4 and the cell 2c which is to be protected from a fault condition. In the illustrated embodiment, the PTC resistor 5 is in parallel with the switch 4 electrically connecting the first terminal T1 with the second terminal T2. During normal operation of the electrical system 1, if each cell 2a-2e supplies a voltage V to the system, then the cells 2a-2e connected in series collectively supply a voltage of 5*V to the load L.

The battery cells 2a-2e can supply a first current $I_1$ to the load L. Within the breaker 3, because the PTC resistor 5 is in parallel with the switch 4, a second current $I_2$ can flow through the switch 4 and a third current $I_3$ can flow through the PTC resistor 5, where $I_1=I_2+I_3$. The resistance Rs of the switch 4 may be significantly smaller than the resistance $R_{PTC}$ of the PTC resistor 5 during normal operation of the system 1. For example, during normal operating conditions, the resistance $R_{PTC}$ of the PTC resistor 5 may be in a range of 1 ohm to 20 ohms, and the resistance Rs of the switch 4 may be in a range of 1 milliohm to 10 milliohms. Accordingly, the relatively low resistance Rs of the switch 4 causes most of the current to flow through the switch 4 without passing through the PTC resistor 5. In some embodiments, for example, during normal operation the second current $I_2$ that flows through the switch 4 and bypasses the PTC resistor may be more than 100 times, more than 1000 times, or more than 10,000 times the third current $I_3$ that flows through the PTC resistor 5. Advantageously, therefore, the relatively low resistance Rs of the switch 4 may not reduce the electrical performance of the larger electrical system 1 during normal operating conditions.

Figure 1B:
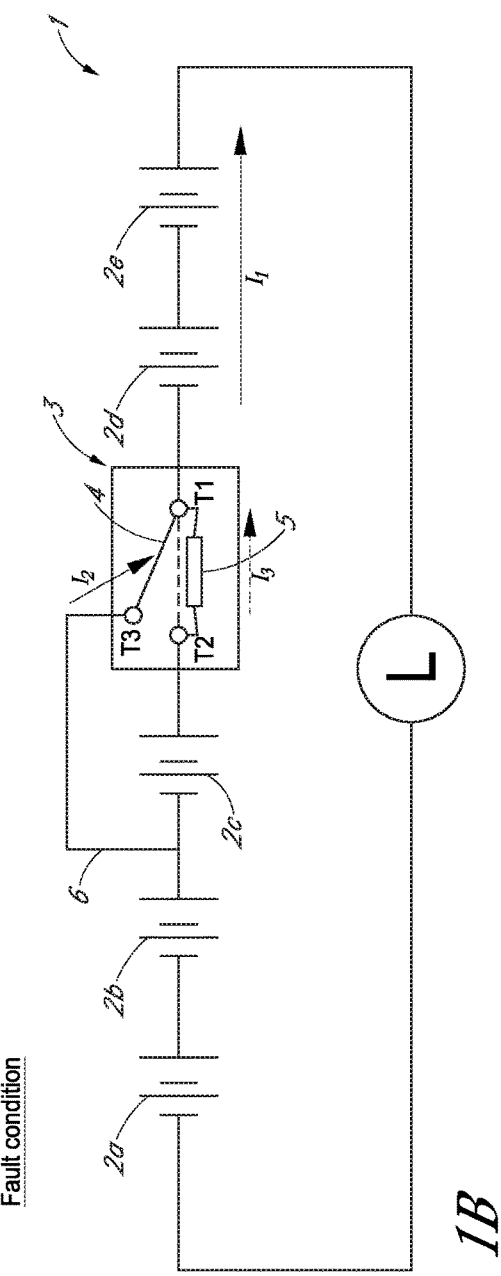
FIG. 1B is a schematic circuit diagram of the system shown in FIG. 1A in a fault condition.

FIG. 1B is a schematic circuit diagram of the system 1 shown in FIG. 1A in a fault condition. Unless otherwise noted, the reference numerals shown in FIG. 1B represent the same components as those shown in FIG. 1A. As explained above, in a fault condition, the cell 2c may experience excessive temperatures and/or current. If the temperature and/or current passing through cell 2c exceed a predetermined temperature and/or current, the switch 4 can move from the normal condition shown in FIG. 1A to the fault condition shown in FIG. 1B. For example, as explained below in connection with FIGS. 2A-3B, in the fault condition the switch 4 can move from the second terminal T2 to a third terminal T3. As shown in FIG. 1B, the third terminal T3 can provide electrical connection to the bypass circuit 6 that bypasses the cell 2c. Thus, in the fault condition, the switch 4 can bypass the cell 2c (which experiences an overtemperature and/or overcurrent fault) to provide electrical connection between the first terminal T1 and the cell 2b adjacent to cell 2c. In the fault condition, most of the current bypasses the cell 2c undergoing an overtemperature and/or overcurrent fault so as to prevent further increases in temperature of and/or current through the cell 2c.

FIG. 2A is a schematic side sectional view of an electrical breaker 3 that can be used in the embodiment of FIGS. 1A-1B in a normal operating condition, according to one embodiment. FIG. 2B is a schematic circuit diagram of the breaker 3 shown in FIG. 2A. FIG. 3A is a schematic side sectional view of the electrical breaker 3 of FIG. 2A in a fault condition. FIG. 3B is a schematic circuit diagram of the breaker 3 shown in FIG. 3A. As shown in FIGS. 2A and 3A, the breaker 3 can comprise an electromechanical device comprising a housing 10 to which the first terminal T1, the second terminal T2, and the third terminal T3 are coupled. The housing 10 can comprise a first conductive line 12 electrically connected to the second terminal T2 and to the PTC resistor 5 by way of one or more interconnects 13. The housing can also comprise a second conductive line 14 along a top side of the housing 10 that is electrically connected to the third terminal T3.

The switch 4 can comprise a movable (e.g., pivotable or bendable) conductive arm 8 and a switching element 7. The pivotable arm 8 can electrically connect to the first terminal T1 and to the switching element 7 by contact. For example, in the normal condition shown in FIG. 2A, the pivotable arm 8 can electrically contact a central portion of the switching element 7. For example, in FIG. 2A, the pivotable arm 8 is shown in a normal condition in which a contact 15 on a distal end portion of the pivotable arm 8 contacts and is electrically connected to the first conductive line 12 and the second terminal T2. In FIG. 3A, the pivotable arm 8 is shown in a fault condition in which another contact 16 contacts and is electrically connected to the second conductive line 14 and the third terminal T3. In the fault condition, the pivotable arm 8 can also electrically contact the switching element 7 at opposing end portions of the switching element 7.

The pivotable arm 8 can move from the normal condition to the fault condition by engaging with the switching element 7 and the PTC resistor 5. For example, the switching element 7 can comprise an electromechanical or thermomechanical switching element, particularly a dome-shaped bimetal element, which changes shape in response to temperature changes. During normal operation, as shown in FIGS. 2A and 2B, the first current $I_1$ can flow along the pivotable arm 8. Most of the current $I_2$ passes through the second terminal T2, the first conductive line 12, and the pivotable arm 8 without passing through the PTC resistor 5. However, a small trickle current $I_3$ (shown in dashed lines) passes from the second terminal T2 and the first conductive line 12 to the pivotable arm 8 through the PTC resistor 5 and the switching element 7. As explained above, during normal operation, the current $I_2$ that bypasses the PTC resistor 5 may be much greater than the trickle current $I_3$ through the PTC resistor 5.

If the temperature and/or current through the breaker 3 exceeds predetermined values, then the breaker 3 can move from the normal operating condition shown in FIGS. 2A-2B to the fault condition shown in FIGS. 3A-3B. For example, if the temperature of the switching element 7 exceeds a particular temperature threshold, which can be selected and tuned in the manufacturing process, then the switching element 7 can switch from the downwardly-curving shape of FIG. 2A to the upwardly-curving shape of FIG. 3A. The PTC resistor 5 can also increase the temperature of the switching element 7, as excessive currents cause corresponding increases in temperature of the PTC resistor 5 and the switching element 7, which contacts the PTC resistor 5. When the switching element 7 changes shape to the upwardly-curving shape shown in FIG. 3A, the contact 16 on the distal end portion of the pivotable arm 8 contacts and electrically connects to the second conductive line 14 and the third terminal T3 (or directly to the third terminal T3 in other embodiments, not shown). Although the switching element 7 is shown as downwardly-curving in the normal condition and upwardly-curving in the fault condition, it should be appreciated that in other arrangements the breaker may also be configured such that the switching element 7 is in an upwardly-curving shape during normal operating conditions and in a downwardly-curving shape during a fault condition.

Thus, in a fault condition, the first current $I_1$ passes to the first terminal T1 along the pivotable arm 8. As the temperature of the PTC resistor 5 increases with the temperature of the cell 2c (FIG. 1B), the resistance $R_{PTC}$ of the PTC resistor 5 correspondingly increases. Due to the increasing resistance $R_{PTC}$ of the PTC resistor 5 with increasing temperature, most of the current $I_2$ passes from the second conductive line 14 and the third terminal T3 to the pivotable arm 8. The second current $I_2$ bypasses the cell 2c by passing along the bypass circuit 6 shown in FIG. 1B. However, a small trickle current $I_3$ still passes from the first conductive line 12 and the second terminal T2, through PTC resistor 5 and the switching element 7 (e.g., at end portions of the switching element 7), to the pivotable arm 8 and the first terminal T1. As explained in additional detail below with respect to FIG. 5, the trickle current $I_3$ can provide a small amount of current from the cell 2c to enable essential device functionality, because the heat generated by the PTC resistor 5 maintains high temperatures after the initial fault condition to prevent the switch 4 from chattering, i.e., from repeatedly switching between the fault mode and the normal operating mode. The skilled artisan will appreciate that the trickle currents $I_3$ through the PTC resistor 5 can have different magnitudes under normal and fault conditions, and that the magnitude of $I_3$ can change during the advent of a fault condition.

Figure 4:
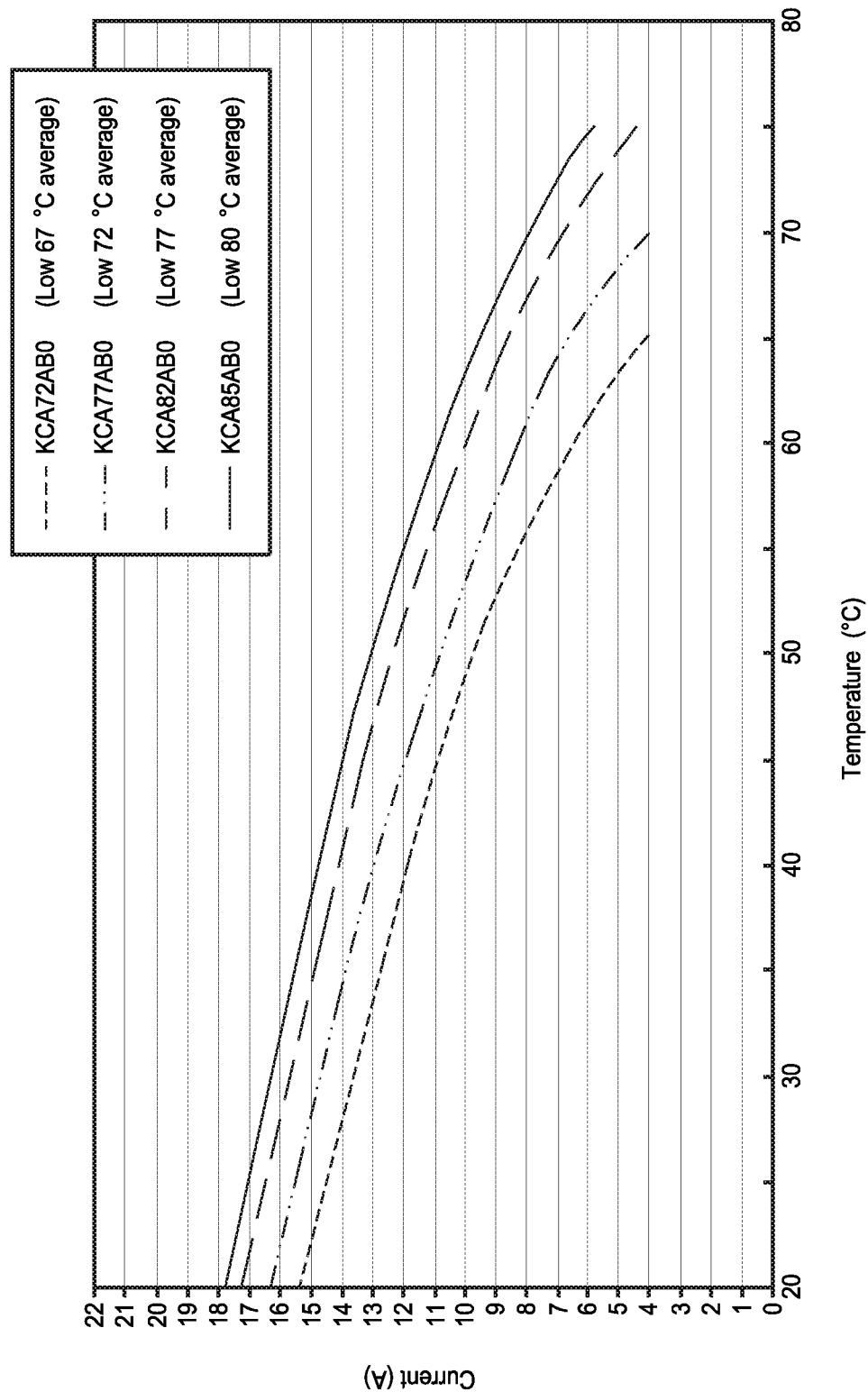
FIG. 4 is a graph that shows the current and temperature at which an exemplary switch trips from a normal operating condition to a fault condition, according to various embodiments.

FIG. 4 is a graph that shows the current and temperature at which an exemplary switch 4 trips from a normal operating condition to a fault condition, according to various embodiments. In particular, FIG. 4 is a plot of current versus temperature for dome-shaped bimetal switches used in Komatsulite™ KCA Series A-Type Breakers, commercially available from Bourns, Inc., of Riverside, Calif. In particular, FIG. 4 plots the current versus temperature for four different versions of the Series A-Type Breakers. In FIG. 4, the line represents the temperature and current combination at which the particular breaker trips to the fault condition. Thus, the region below each line indicates a normal condition and the region at the line and above indicates a fault condition. As shown in FIG. 4, the switch 4 can trip from the normal operating condition to the fault condition at relatively high temperatures (even at low currents) and/or at relatively high currents (even at low temperatures). For example, the switch 4 can trip from the normal operating condition to the fault condition when the switch 4 reaches a predetermined temperature in a range of 65° C. to 85° C., or more particularly, in a range of 70° C. to 80° C., depending upon the design.

The use of the PTC resistor 5 can provide various advantages in some embodiments. As explained herein, the PTC resistor 5 can enable the switch 4 and breaker 3 to operate in a stable manner, such that the breaker 3 does not chatter at a high rate between the normal condition and the fault condition by maintaining an elevated temperature after an initial fault condition. Furthermore, the reduction in the temperature of PTC resistor 5 can assist in resetting the breaker 3 from the fault condition to the normal operating condition under some circumstances.

Figure 5:
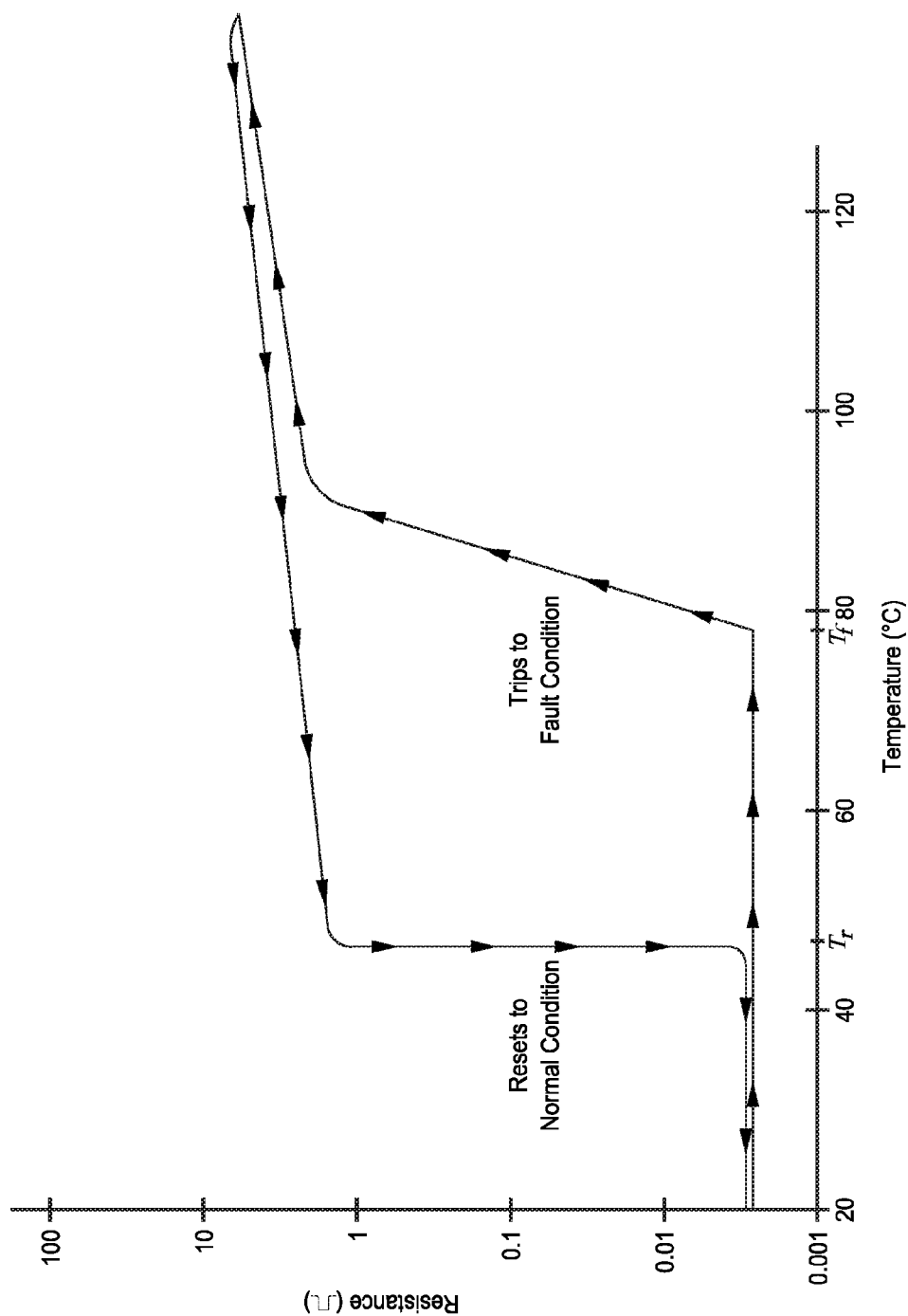
FIG. 5 is a schematic graph that shows the relationship between temperature and resistance of an exemplary positive temperature coefficient (PTC) resistor, according to various embodiments.

FIG. 5 is a schematic graph that shows the relationship between temperature and resistance of an exemplary PTC resistor, according to various embodiments. For example, as shown in FIG. 5, at temperatures below a predetermined fault temperature $T_f$, the resistance $R_{PTC}$ of the PTC resistor 5 can be at a relatively low level (but can be higher than the resistance $R_S$ of the switch 4). As the temperature of the PTC resistor 5 reaches the predetermined fault temperature $T_f$, the resistance $R_{PTC}$ can increase significantly with increasing temperature. In the breaker 3 of FIGS. 1A-3B, the increasing temperature of the PTC resistor 5 can further increase the temperature of the switching element 7 that contacts the PTC resistor 5. Thus, the increasing temperature of the PTC resistor 5 can accelerate or otherwise assist in causing the switching element 7 to change shape and trip to the fault condition shown in FIGS. 3A-3B.

The correspondingly high resistance $R_{PTC}$ of the PTC resistor 5 can cause most of the current to pass along the pivotable arm 8, while maintaining a trickle current $I_3$ through the PTC resistor 5. If the temperature of the bypassed cell 2c decreases (for example, due to the reduced current passing through the bypassed cell 2c), the PTC resistor 5 may still have high resistance $R_{PTC}$ due to hysteresis and the fact that the resistance $R_{PTC}$ of the PTC resistor 5 increases with the higher temperature causing the fault, and thus generates its own heat to maintain the switching element (e.g., bimetal element) in the fault condition longer than it would in the absence of the PTC element. That is, even though the temperature of the PTC resistor 5 decreases by a significant amount, the PTC resistor 5 maintains the high resistance $R_{PTC}$ levels caused by the fault condition, until the temperature drops below a reset temperature $T_r$.

Advantageously, the hysteresis shown in FIG. 5 can prevent the breaker 3 from operating in a chatter mode. In a chatter mode, without the hysteresis shown in FIG. 5, as the temperature decreases (even slightly), the temperature of the bimetallic switching element 7 would decrease and switch back into the normal operating condition prematurely. The increasing current of the operating condition would again increase the temperature of the switching element 7 past the fault temperature $T_f$, and the breaker might repeatedly switch from normal operating condition to fault condition, and back again. Such a chattering mode is undesirable and can lead to instability in the larger electrical system 1.

The hysteresis shown in FIG. 5 therefore allows the PTC resistor 5 to maintain a high resistance, and a correspondingly relatively high temperature, which can maintain the switching element 7 in the fault condition until the temperature drops to the reset temperature $T_r$. Moreover, the small trickle current $I_3$ through the PTC resistor may help to maintain the temperatures sufficiently high so as to prevent chattering. Once the temperature of the breaker 3 drops below the reset temperature $T_r$, the resistance of the PTC resistor 5 can drop back to the resistance $R_{PTC}$ of the normal operating condition. In various embodiments, the fault temperature $T_f$ can be in a range of 65° C. to 85° C., or more particularly, in a range of 70° C. to 80° C. In various embodiments, the reset temperature $T_r$ can be in a range of 30° C. to 60° C., or more particularly in a range of 40° C. to 55° C.

Thus, the breaker 3 of FIGS. 1A-3B can advantageously employ a PTC resistor 5 connected with the switch 4 (for example, in parallel) to maintain stable operating and fault conditions. The breaker 3 of FIGS. 1A-3B can advantageously be resettable in some arrangements, such that the breaker 3 can return to the normal operating condition if the fault condition subsides (for example, by a sufficient decrease in current and/or temperature). Furthermore, as explained herein, the breaker 3 can stably move to the fault condition and back to the normal operating condition without chattering.

Figure 6A:
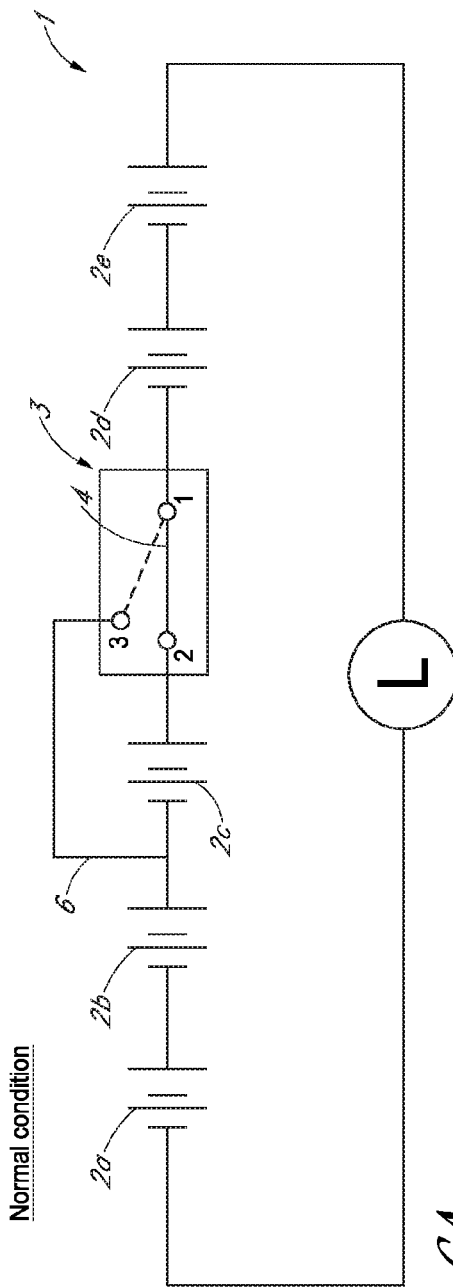
FIG. 6A is a schematic circuit diagram of an electrical system in a normal operating condition, according to another embodiment.
Figure 6B:
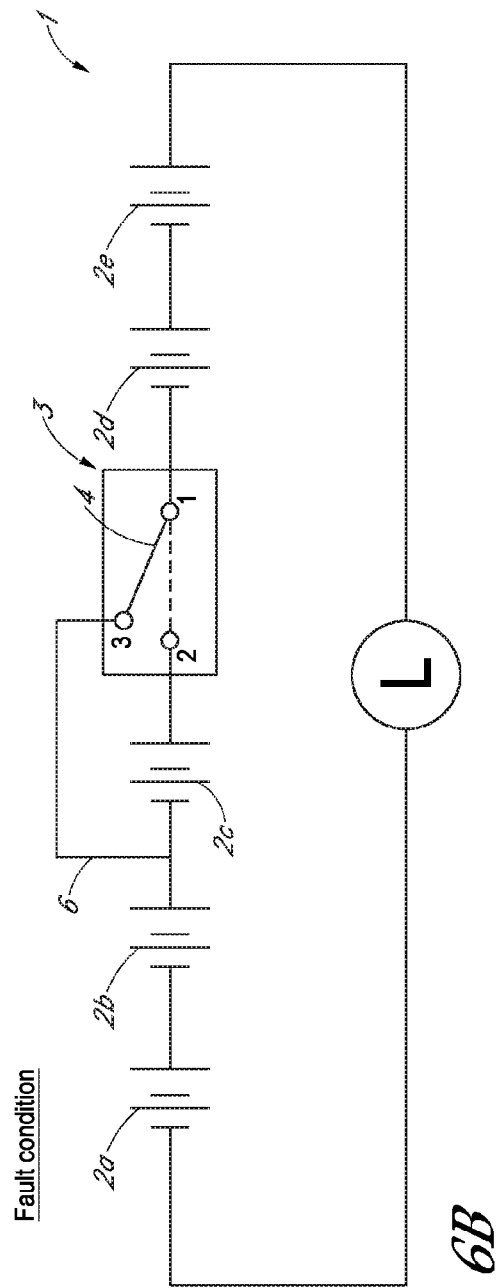
FIG. 6B is a schematic circuit diagram of the system shown in FIG. 6A in a fault condition.

FIG. 6A is a schematic circuit diagram of an electrical system 1 in a normal operating condition, according to another embodiment. FIG. 6B is a schematic circuit diagram of the system 1 shown in FIG. 6A in a fault condition. Unless otherwise noted, the components of FIGS. 6A-6B represent the same or generally similar features as those shown and described in connection with FIGS. 1A-3B. For example, as with the embodiment of FIGS. 1A-1B, a breaker 3 can be provided to bypass current around a particular battery cell 2c. Unlike the embodiment of FIGS. 1A-3B, however, in the embodiment of FIGS. 6A-6B, the breaker 3 may be non-resettable. Thus, in the embodiment of FIGS. 6A-6B, once the switch 4 trips from the normal operating condition to the fault condition, the switch 4 does not automatically reset back to the normal operation condition. The breaker 3 may therefore act as a non-resettable switch that diverts current around the cell 2c which experiences a fault condition. A battery management system can detect the drop in voltage across the bypassed cell 2c, and can trigger an alert to the user that the cell 2c is not operating properly and has been shunted out of the circuit. The user can respond to the alert by replacing or fixing the cell 2c, and can manually reset or replace the breaker 3.

In the embodiment of FIGS. 6A-6B, the breaker 3 may not include a PTC resistor, such as the PTC resistor 5 shown in FIGS. 1A-3B. In such arrangements, the switch 4 may include a bimetal switching element (similar to switching element 7) which changes shape (e.g., inverts) as the temperature of the breaker 3 rises. Once the breaker reaches the fault condition, the switch 4 can trip to connect to the third terminal T3 to bypass the cell 2c. In a non-resettable breaker 3, the switching element can be shaped such that a drop in temperature does not cause the switching element to revert back to the normal operating condition.

In still other arrangements, a non-resettable breaker 3 may include a PTC resistor similar to that shown in FIGS. 1A-3B, but the shape of the switch 4 (and associated switching elements) may be selected so as to prevent the switch 4 from reverting to the normal condition after tripping to the fault condition. In such arrangements, the PTC resistor can act to heat up the bimetal switching element more rapidly so as to trigger the fault condition. As explained above, the PTC resistor may also allow a small trickle current to flow through the cell 2c so as to enable critical device functionality.

Thus, in various embodiments, the breaker 3 may be resettable such that the switch 4 can move back and forth between a normal operating condition and a fault condition in a stable, chatter-less manner. In some embodiments, the breaker 3 may be non-resettable such that the switch 4 does not automatically move back to the normal operating condition after tripping into the fault condition.

Figure 7:
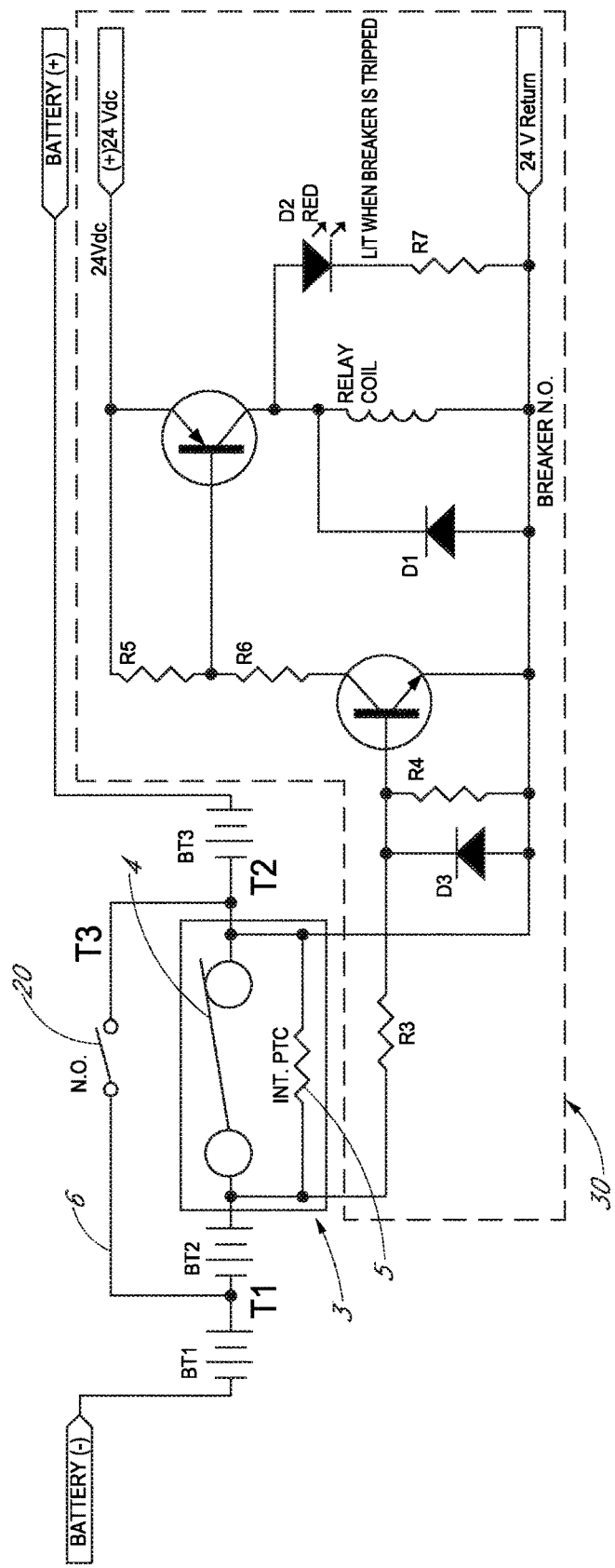
FIG. 7 is a schematic circuit diagram of an electrical system, which can be used to simulate the performance of the system, according to yet another embodiment.

FIG. 7 is a schematic circuit diagram of an electrical system 1, according to yet another embodiment. In some arrangements, the system 1 shown in FIG. 7 can be used to model the performance of the systems utilizing the embodiments disclosed in FIGS. 1A-6B. In other arrangements, the system 1 can be physically implemented (e.g., using discrete electrical components and/or integrated circuit/device technology) to effectively act as a three-terminal breaker as described herein. Unless otherwise noted, the components of FIG. 7 represent the same or generally similar features as those shown and described in connection with FIGS. 1A-6B. For example, the system 1 can include a plurality of battery cells BT1, BT2, and BT3 connected in series. A breaker 3 can be electrically connected to a particular cell BT2 that is to be protected from a fault condition. As with the embodiments of FIGS. 1A-3B, the breaker 3 can comprise a switch 4 connected with a PTC resistor 5. In FIG. 7, the switch 4 may be in parallel with the PTC resistor 5, but in other embodiments, the PTC resistor 5 may be placed elsewhere.

As the temperature of the switch 4 and/or the PTC resistor 5 increases, the resistance $R_{PTC}$ of the PTC resistor 5 correspondingly increases. Furthermore, the increasing temperature of the switch 4 and/or the PTC resistor 5 can cause the switch 4 to open when the temperature and/or current exceeds a predetermined threshold.

Unlike in the embodiment of FIGS. 1A-3B, however, in the embodiment of FIG. 7, the switch 4 may not directly contact the third terminal T3. By contrast, the bypass circuit 6 which bypasses the cell 2c may comprise a relay 20 which is normally open during normal operating conditions. During a fault condition, a sensing circuit 30 (which can also comprise a current-sensing resistor, a magnetic current resistor, and/or a temperature sensing thermistor) can detect the voltage drop across the breaker 3 when the switch 4 trips to the fault condition. The sensing circuit 30 can send a signal to the relay 20 to close the relay 20 and divert the current around the protected cell 2c. Thus, in the embodiment of FIG. 7, instead of causing the switch 4 to connect to the third terminal T3 directly, the sensing circuit 30 can detect the fault condition based on a voltage drop across the breaker 3 and can cause the relay 20 to connect to the third terminal T3 while the switch 4 remains open.

Example

An automated test for system 1 shown in FIG. 7 has been developed which utilizes a dedicated test board and an external holder for three 3.6 Vdc Li-ion cells (corresponding to BT1, BT2, and BT3) at 2.5 Ah. The test board can include three resistance temperature detector (RTD) temperature sensors, connected in Kelvin mode, the individual battery cells BT1, BT2, BT3 in the external holder, an external load, and a breaker 3 to be connected via screw-type terminal blocks. The breaker 3 used in this example test was the Komatsulite™ model NR82CBO, manufactured by Bourns, Inc., of Riverside, Calif. Terminal blocks may also be used to connect an external resistance measurement instrument in Kelvin fashion for measuring the RTDs, and three other screw terminals can be used for grounding of shields on the RTDs.

The test can be implemented to add a high current normally open relay 20 to the breaker 3 so that the breaker 3 acts as if it has a single pole, double throw (SPDT) switching action. A voltage drop across the breaker 3 is monitored. In the example test procedure, a voltage of 0.65 Vdc or more across the breaker 3 caused the relay 20 to close, indicating a tripped-to-open breaker. A voltage of 0.5 Vdc or less across the breaker 3 allows the relay 20 to open, indicating a reset breaker. This action allows the relay 20 and the breaker's contacts to emulate an SPDT switch. When the breaker 3 is closed, or not tripped, the three cells BT1-BT3 are connected in series and may be loaded as desired. A light 240 ohm load on the board can be placed across all the cells BT1-BT3. The externally attached load (e.g., up to 10 A), can also be connected across the cells. The breaker 3 can be applied to protect the second or center cell BT2 in the series of three cells. When the breaker 3 opens due to an overcurrent and/or overheating fault, then the second cell BT2 is bypassed from the series of three cells and becomes shorted across the open breaker to provide energy to heat the PTC resistor 5. This action keeps the breaker 3 open for as long as the second cell BT2 has the charge to keep the PTC resistor 5 warm enough to maintain the breaker 3 in an open state. When the protected cell voltage drops to a level at which the breaker's PTC resistor 5 cools down enough to allow the breaker 3 to reset, then the breaker 3 resets, and the external relay 20 opens. This action returns the protected cell BT2 into the series of three cells again. The test procedure can be implemented to determine how long, after the breaker 3 is tripped open, the protected cell BT2 can keep the breaker 3 open before the cell BT2 discharges too much to continue doing so.

Software has also been implemented to conduct the test procedures. The software can be programmed with a user interface on a computer and configured to automatically test the system 1 of FIG. 7. If the breaker 3 is tripped, then the software iteratively records the time of the tripped breaker, the voltage of each cell BT1-BT3, the voltage across the breaker 3, the total voltage across the connected cells BT1 and BT3, the current through the PTC resistor 5, the temperature of the protected cell BT2 and the breaker 3, the temperature of the other cells BT1 and BT3, and/or any other suitable data. The program can terminate when any combination of conditions is met, for example: (1) the voltage of any of BT1-BT3 drops to less than 1.10 Vdc, (2) the breaker 3 resets to a closed state (e.g., as indicated by a breaker voltage of less than 0.2 Vdc), (3) the temperature of any of the three cells BT1-BT3 exceeds 85° C., or (4) the breaker current is less than 5 mA (e.g., due to a failed breaker 3), and/or any other suitable predetermined conditions.

The test board and system 1 can also be used to charge the battery cells BT1-BT3. The cells BT1-BT3 can be individually simultaneously charged using three independent charging sources, or the entire string of three battery cells BT1-BT3 can be charged at once with a single charging source using three times the charging voltage of a single cell. In this arrangement, all three cells BT1-BT3 are individually initially charged by applying a constant current (e.g., limited to 1 A maximum), with a maximum voltage of 4.10 Vdc. When the voltage across a particular cell has reached 4.10 Vdc and the charging current drops to 100 mA, the charge is considered complete and is terminated.

In some arrangements, the test board and system 1 can be used to test the charging of the three cells BT1-BT3 with a 12.3 Vdc/1 A source at a 0.4 C charge rate. For example if the system 1 detects that the software terminated or was interrupted because the breaker 3 has reset, and if the voltage of BT2 is positive, then the software can initiate charging of the three cells BT1-BT3. The charging can be conducted with 1 A current at a maximum voltage of 12.3 Vdc across the three cells BT1-BT3. The system 1 can therefore act as a battery management system and can take measurements of the voltages of each cell BT1-BT3, the combined voltage of all three cells, the current in amperes, and the temperature of each cell BT1-BT3. The charging operation can terminate when any combination of the following conditions occurs: (1) the voltage of any one of cells BT1-BT3 exceeds 4.099 Vdc; (2) the current drops to less than 100 mA; and/or the temperature of any of the cells BT1-BT3 exceeds 50° C.

Although the embodiments disclosed herein may relate to electrical systems and devices that utilize batteries, it should be appreciated that the breakers 3 disclosed herein can be used with any other suitable type of circuit element. For example, the breakers 3 disclosed herein may be used in any circuit elements that are susceptible to overtemperature and/or overcurrent fault conditions. Furthermore, the breakers 3 disclosed herein may also be used in non-battery power systems, including both direct current (DC) and alternating current (AC) applications.

II. Examples of Battery Housings

In some systems, battery cells are connected together using metal ribbons or other types of electrical interconnects. The ribbons or other interconnects may be spot welded, soldered, or otherwise joined to the positive and negative terminals of the cells. For example, cylindrical lithium ion cells (such as those used in electric bicycles) are typically spot welded to one another in series or parallel using ribbon interconnects. To replace cells with connections that utilize welded joints, solder joints, or other types of metal joining processes, the user breaks the joint, replaces the battery cell, and re-joins the connection to the new battery cell using the desired metal joining process. However, metal joining processes, such as welding, soldering, etc., may require an excessive amount of time, equipment, and/or expertise to form the joint. Moreover, even where the metal joint between two battery cells provides sufficient electrical connectivity, the interconnects and joints may not be adequately housed or packaged in a compact manner. For example, in some arrangements, the interconnects and/or joints may become entangled and/or may flap around if adequate packaging is not provided. In various embodiments, the breaker 3 disclosed herein with respect to FIGS. 1A-7 may also be welded, soldered, or otherwise joined with the interconnects and/or batteries using suitable metal joining processes. However, as explained above, such metal joining processes may be time-consuming and expensive, and may require specialized expertise. The battery housings disclosed herein can be used in combination with any of the breakers 3 described above in connection with FIGS. 1A-7.

Accordingly, various embodiments disclosed herein utilize a modular battery housing that incorporates circuit breakers having the function and/or form disclosed above in connection with FIGS. 1A-7. The battery housing can comprise a housing body that defines a cavity sized and shaped to receive one or more battery cells. A breaker (which may be similar to or the same as the breakers 3 disclosed with respect to FIGS. 1A-7) having a switch may be coupled or integrated with the housing body. A first electrical conductor can be disposed at a first end portion of the housing body and electrically connected to the switch. The first electrical conductor can be configured to electrically connect to a first battery cell terminal of the battery cell. A second electrical conductor can be disposed at a second end portion of the housing body. The second electrical conductor can be configured to electrically connect to a second battery cell terminal of the battery cell to define a first electrical pathway between the first electrical conductor and the second electrical conductor. A bypass conductor can also be coupled with the housing body. The bypass conductor can be electrically connected to the switch and the second electrical conductor to define a second electrical pathway between the switch and the second electrical conductor.

In a normal condition, the breaker may be configured such that all the current flows along the first electrical pathway through the battery cell between the first and second electrical conductors. In a fault condition (such as an overtemperature and/or overcurrent condition), the breaker may be configured such that a majority (or all) of the current bypasses the battery cell and flows along the second pathway between the switch and the second electrical conductor. In some embodiments, a minority of the current flows through the battery cell in the fault condition. Advantageously, the battery housings disclosed herein can enable the user to simply snap the battery cell inside the cavity of the battery housing, without performing any metal joining processes, such as welding, soldering, etc. Moreover, the battery housing provides a compact structural support for one or more battery cells and provides a modular construction in which multiple battery housings may be connected to one another to provide any number of battery cells in series or parallel. The housing body may comprise insulating walls which can mechanically and electrically separate the conductive components, such as the insulator coated housing of the cells, cell contacts, modular battery terminals, and conductive segments, so as to prevent components of the housing from shorting to one another. The housing body may alternatively or additionally comprise insulating spacer elements, which provide air gaps to mechanically and electrically separate the conductive components, such as the insulator coated housing of the cells, cell contacts, leads, and conductive segments, so as to prevent components of the housing from shorting to one another.

FIG. 8A is a schematic top, front, right perspective view of a battery housing 100, according to one embodiment. FIG. 8B is a schematic, bottom, front, left perspective view of the battery housing 100 shown in FIG. 8A. The battery housing 100 can comprise a housing body 101 having one or more walls 110 and defining a cavity 102 sized and shaped to receive one or more battery cells (see FIGS. 9A-9B). The walls 110 of the housing body 101 can comprise an insulating material which serves to define the receptacle for receiving cells, and to electrically separate the conductive materials that are coupled to or formed with the walls 110. For example, the insulating material of the walls 110 may comprise a plastic or polymer material, a ceramic material, etc.

The housing body 101 can comprise a first end portion 111 (e.g., top) and a second end portion 112 (e.g., bottom) opposite the first end portion 111. A first wall 110a and a second wall 110b can extend between the first and second end portions 111, 112, and can be spaced apart from one another along the illustrated y-axis by a distance sufficient to receive a width of a battery cell. A third wall 110c and a fourth wall 110d can be disposed at the respective first and second end portions 111, 112, and can be spaced apart from one another along the illustrated z-axis by a distance sufficient to receive a length of the battery cell. As shown in FIGS. 8A-8B, each of the third and fourth walls 110c, 110d may comprise openings 117 through which terminals of the battery cells may be exposed. The cavity 102 may be defined by the first, second, third, and fourth walls 110a-110d. In the illustrated embodiment, the cavity 102 can be accessed by way of apertures defined in the z-y plane on both ends (e.g., left and right ends) of the housing 100. In other embodiments, there may be additional walls formed in the z-y plane so as to form a completely enclosed housing. In such embodiments, the cavity 102 may be accessed by providing one or more doors which may be opened and closed when inserting and/or removing the battery cell or battery cells, and/or through openings in the first and second walls 110a, 110b.

The cavity 102 illustrated in FIGS. 8A-8B is sized and shaped to receive two battery cells, such as two cylindrical lithium ion battery cells, but it should be appreciated that the cavity 102 may be shaped to receive other types, sizes, shapes or numbers of battery cells. For example, the cavity 102 may instead be sized to receive only one battery cell, or may be sized to receive two battery cells, three battery cells, four battery cells, five battery cells, six battery cells, seven battery cells, eight battery cells, or more than eight battery cells. Further, although the cavity 102 shown in FIGS. 8A-8B is shown as being shaped to receive elongated cylindrical battery cells, in other arrangements, the cavity 102 may be sized and shaped to receive battery cells having rectangular, square, or polygonal cross-sections, or to receive battery cells having a coin profile (e.g., the height or length of the battery cell is smaller than the width or diameter).

Advantageously, the housing body 101 and cavity 102 can be sized and shaped such that a battery cell can be snapped into the housing body 101 without requiring any tools to connect the battery cell to the housing 110, e.g., by way of a tool-less connection. For example, in some embodiments, cell contacts which connect to battery cell terminals of the battery cell can be spaced apart by a distance less than the length of the battery cell such that the battery cell can be snapped between the contacts (e.g., the battery cell can be urged between the contacts and can deflect the contacts away from one another). In other embodiments, the length (along the z-axis) and/or the width (along the y-axis) of the housing body 101 may be selected so as to be slightly smaller than the respective length and width dimensions of the battery cell. The housing body 101 may be sufficiently compliant such that the user can urge the slightly larger battery cell (or battery cells) into the cavity 102, causing the housing body 101 to flex to receive the battery cell or battery cells. Once the battery cell or battery cells are in the housing 100, the housing body 101 can relax to secure the battery cell or battery cells within the cavity 102. Such snap-fit connections enable a relatively simple battery cell installation or replacement process, in which the battery cell or battery cells is or are mechanically and electrically connected to the housing 100 by way of the snap-fit connection. Although a snap-fit connection is described herein, it should be appreciated that other tool-less connections between the cell and the housing may be used. Moreover, in some embodiments, the cells may be connected to the cell contacts 105a-105c using any suitable metal joining process or material. For example, in some embodiments, the cell contacts 105a-105d can be connected to the cells using solder, welding, conductive epoxy, etc. Such metal joining connections may be used to reduce the resistance of the connections and/or to improve the reliability of the battery housing.

The battery housing 100 can also include a first modular battery terminal 104a and a second modular battery terminal 104b, each configured to electrically communicate with an external component, such as another modularly connected battery housing, an electrical load, etc. The housing 100 can also include a plurality of electrical conductors configured to direct current along various electrical pathways, as explained in detail in connection with FIGS. 9A-12. For example, the housing 100 can comprise a first conductive segment 107a, a second conductive segment 107b, a third conductive segment 107c, a fourth conductive segment 107d, a fifth conductive segment 107e, and a sixth conductive segment 107f. A first cell contact 105a can be configured to contact a first battery cell terminal of a first cell, and a second cell contact 105b can be configured to contact a second battery cell terminal of a second cell. Similarly, a third cell contact 105c can be configured to contact a second battery cell terminal of the first cell, and a fourth cell contact 105d can be configured to contact a first battery cell terminal of the second cell. The housing 100 can also include a first bypass conductor 106a and a second bypass conductor 106b. In addition, a first breaker 3a can be connected to the first conductive segment 107a, the second conductive segment 107b, and the first bypass conductor 106a. A second breaker 3b can be connected to the third conductive segment 107c, the fourth conductive segment 107d, and the second bypass conductor 106b.

As explained herein, the battery housing 100 (which may receive a single cell or multiple cells) and conductors can define various electrical pathways for the flow of current through the housing 100 and the one or more cell(s) disposed in the housing 100. The battery housing 100 can include a three-terminal breaker (e.g., the breakers 3a, 3b) integrated with the battery housing 100. As explained above in connection with FIGS. 1A-7, the breakers 3a, 3b can have a normal operating condition and a fault condition. The breakers 3a, 3b can enter the fault condition when the cell(s) are subjected to overtemperature and/or overcurrent situations. The battery housing 100 can define a primary current pathway through the cell when the breaker is in the normal operating condition. The battery housing 100 can define a bypass current pathway configured to bypass the cell when the circuit breaker is in the fault condition. For example, in the normal operating condition, the first terminal T1 of the breaker 3a, 3b can be connected to the second terminal T2 such that current flows through the switch connecting T1 to T2, and through the cell along the primary current pathway. In the fault condition, the first terminal T1 can move to be connected to the third terminal T3 of the breaker 3a, 3b. In the fault condition, a minority of the current (e.g., a small trickle current) can flow along the primary current pathway and a majority of the current can flow along the bypass current pathway. In some arrangements, a PTC resistor is provided in the breaker 3a, 3b. As explained above, the breaker 3a, 3b can comprise a bimetal switch which can move from the second terminal T2 to the third terminal T3 when the cell is in the fault condition. The breaker 3a, 3b can be positioned at any suitable location in the battery housing to detect a fault condition (e.g., an overtemperature and/or overcurrent situation) and to cause the current to bypass the cell when in the fault condition.

Although the electrical conductors illustrated herein may be described as corresponding to separate conductive segments or contacts, it should be appreciated that the conductive segments or contacts may instead be formed from fewer conductive segments (e.g., the conductor may be continuous). For example, although the first conductive segment 107a is illustrated as being separate from the modular battery terminal 104a, in other embodiments, the modular battery terminal 104a may be directly connected to the breaker 3a without an intervening segment, or the modular battery terminal 104a may be connected to the breaker 3a by way of a continuous conductive material. Similarly, even though the second conductive segment 107b is illustrated as being separate from the first cell contact 105a, it should be appreciated that the breaker 3a may be directly connected with the cell contact 105a without an intervening segment, or the cell contact 105a may comprise a continuous conductive material between the breaker 3a and the cell. Similarly, the breaker 3b may be directly connected through a cell contact to the cell without intervening segments 107c and 107d. And, the bypass conductors 106a, 106b may be connected directly from breakers 3a, 3b to the cell contacts 105a, 105b without intervening segments (or by way of a continuous conductive material). A skilled artisan would appreciate that various types of electrical routing arrangements may be suitable for use with the embodiments disclosed herein.

The electrical conductors (e.g., the conductive segments 107a-107f, the cell contacts 105a-105d, the modular battery terminals 104a-104b, and the bypass conductors 106a, 106b) can be coupled to or formed with the housing body 101. For example, in some embodiments, the housing body 101 can be formed using a suitable process, such as injection molding, three-dimensional (3D) printing, etc. The conductors can be connected to recesses sized and shaped to receive the conductors, or the housing body 101 can be molded around the desired conductors. In some embodiments, adhesives may be used to connect the conductors to the housing body 101. In other embodiments, the entire battery housing 100 (e.g., including the insulating housing body 101 and the conductors) may be manufactured using a 3D printing process capable of simultaneously defining insulating and conductive structures in a single monolithic body.

In addition, as shown in FIGS. 8A-8B, a first connector 135a can be coupled to or formed with the second cell contact 105b. A second connector 135b can be coupled to or formed with the third cell contact 105c. The first and second connectors 135a, 135b can comprise conductive tabs or lugs which are configured to electrically connect to a battery management system (BMS). For example, in some embodiments, the second and third cell contacts 105b, 105c can electrically connect the negative terminals of battery cells with the first and second connectors 135a, 135b, respectively. The BMS (see FIGS. 13A-13B) can monitor the voltage of each battery cell and can notify the user (e.g., with an alarm or other indicator) if the voltage of the cells rises or drops to unacceptable levels. For example, in some embodiments, the BMS can determine if one or more battery cells has been bypassed due to, e.g., the switch being in a fault condition. Such a notification can alert the user that the battery cells should be replaced.

Figure 11A:
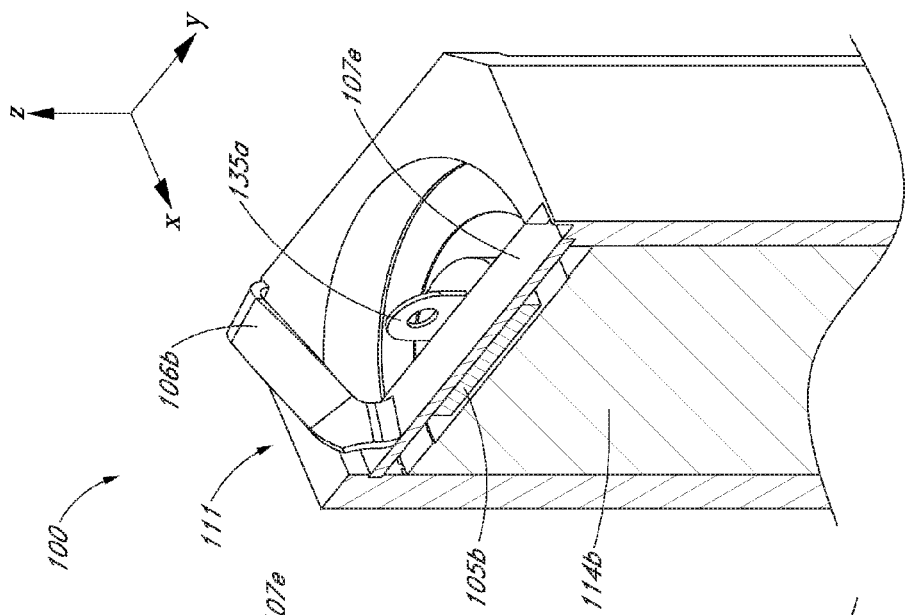
FIG. 11A is a schematic top, rear, and right perspective cross-sectional view of the battery housing and battery cells, with the cross-section taken along the battery terminal and the first cell contact.
Figure 11B:
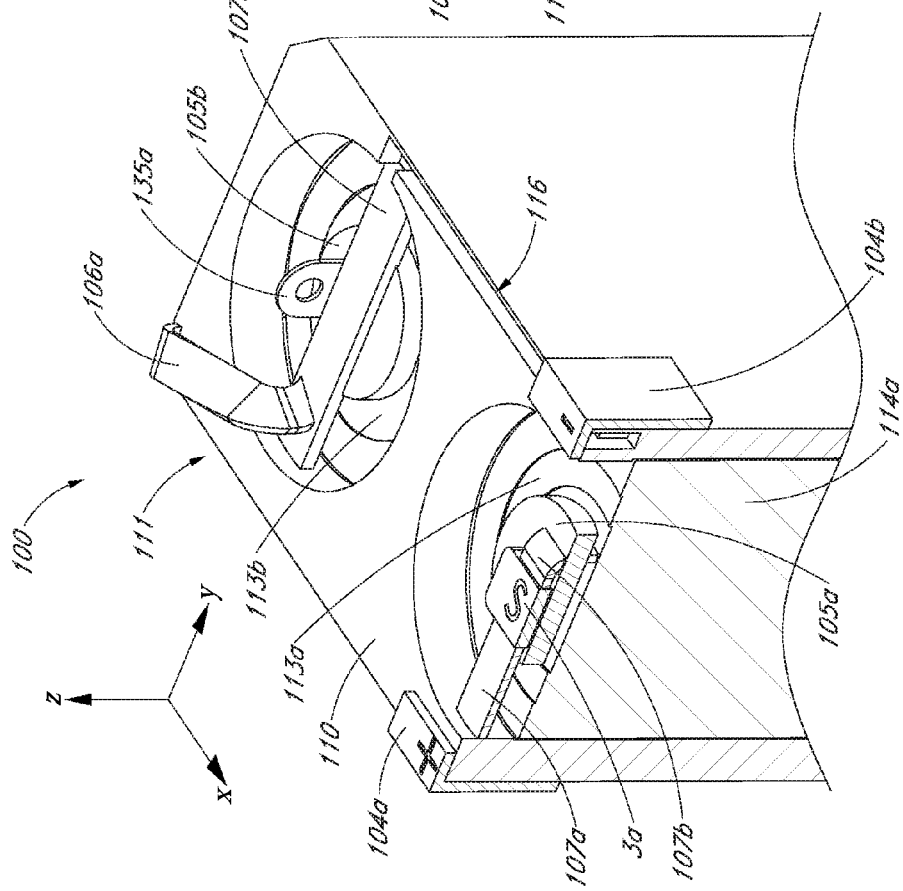
FIG. 11B is a schematic top, rear, and right perspective cross-sectional view of the battery housing and battery cells, with the cross-section taken along the second cell contact.

FIG. 9A is a schematic top, front, right perspective view of the battery housing 100 shown in FIGS. 8A-8B, with a first cell 114a and a second cell 114b disposed in the housing 100. FIG. 9B is a schematic, bottom, front, left perspective view of the battery housing 100 and cells 114a, 114b of FIG. 9A. FIG. 10A is a schematic top plan view of the battery housing 100 and cells 114a, 114b shown in FIGS. 9A-9B. FIG. 10B is a schematic bottom plan view of the battery housing 100 and cells 114a, 114b shown in FIGS. 9A-10A. FIG. 11A is a schematic top, rear, right perspective cross-sectional view of the battery housing 100 and cells 114a, 114b, with the cross-section taken through the modular battery terminals 104a, 104b and the first cell contact 105a. FIG. 11B is a schematic top, rear, right perspective cross-sectional view of the battery housing 100 and cells 114a, 114b, with the cross-section taken through the second cell contact 105b.

The first and second cells 114a, 114b shown in FIGS. 9A-11B are cylindrical battery cells (e.g., lithium ion battery cells), although as explained above, the battery cells can comprise any suitable shape or profile, and any suitable type of battery cells. Moreover, as explained above, although two cells 114a, 114b are shown, more or fewer battery cells may be disposed in the housing 100. For example, in some embodiments, the battery housing 100 can be sized and shaped to receive a single cell. Multiple housings with one or more cells can be connected together in a modular arrangement. In the arrangement of FIGS. 9A-9B, each cell 114a, 114b comprises a first battery cell terminal 113a (e.g., a positive terminal) and a second battery cell terminal 113b (e.g., a negative terminal). The cells 114a, 114b may be disposed in the housing 101 such that the first battery cell terminal 113a of the first cell 114a is at or near the first end portion 111 and the second battery cell terminal 113b of the first cell 114a is disposed at or near the second end portion 112. The first battery cell terminal 113a of the second cell 114b may be disposed at or near the second end portion 112 adjacent the second battery cell terminal 113b of the first cell 114a. The second battery cell terminal 113b of the second cell 114b may be disposed at or near the first end portion 111 adjacent the first battery cell terminal 113a of the first cell 114a.

FIGS. 9A-9B illustrate various electrical pathways P1-P7 defined by the battery housing 100. In the illustrated embodiment, the arrows for the pathways P1-P7 illustrate the direction of electron flow (assuming that first battery cell terminal 113a is a positive terminal), which the skilled artisan will understand is opposite the direction of the conventional definition for electrical current. Thus, to envision current flow in the example provided, the direction of all arrowheads can be reversed. In other embodiments, the electrons may flow opposite the direction illustrated, depending on the polarity of the cells 114a, 114b relative to the housing 100.

A first pathway P1 (FIGS. 9A and 10A) can be defined between the first modular battery terminal 104a and the breaker 3a, which may comprise a switch similar to those disclosed throughout this disclosure. The first modular battery terminal 104a can be configured to provide electrical communication with an external component, such as another battery housing, an electrical load, etc. The first modular battery terminal 104a can be disposed on an exterior surface of the housing body 101, e.g., disposed on the exterior surface of the first wall 110a. In other embodiments, however, the first modular battery terminal 104a may be disposed on other surfaces of the housing 100 and may comprise other shapes and profiles. For example, in other embodiments, the modular battery terminal 104a may extend outwardly from the housing body 101 to facilitate electrical connection to the external component. Current can flow between the first modular battery terminal 104a and the first breaker 3a along the first conductive segment 107a. As explained above, in some embodiments, the first segment 107a can be a separate piece of conductive material that is joined to the modular battery terminal 104a and the breaker 3a. In other embodiments, the first pathway P1 is defined between the modular battery terminal 104a and the breaker 3a along a continuous piece of conductive material.

One end of the first segment 107a can be electrically connected to a first terminal of the breaker 3a, such as the first terminal T1 described and illustrated in connection with FIGS. 1A-3B and 6A-7. For example, the segment 107a can be welded or soldered to the first terminal T1, or can be electrically connected in other ways. The second conductive segment 107b can electrically connect to the breaker 3a and the first cell contact 105a. For example, one end of the second segment 107b can electrically connect to the second terminal T2 of the breaker 3, and the other end of the second segment 107b can electrically connect to the first cell contact 105a. As explained above, in some embodiments, the second segment 107b can comprise a separate piece of conductive material from the breaker 3a and the cell contact 105a. In other embodiments, the second terminal T2 of the breaker 3a and the first cell contact 105a can comprise a continuous piece of conductive material. As one example, as shown in FIG. 11A, the second segment 107b can be bent so as to extend through an aperture of the first cell contact 105a to secure the second segment 107a to the cell contact 105a and to provide electrical connectivity to the first terminal 113a of the first cell 114a. The first bypass conductor 106a can be electrically connected to the third terminal T3 of breaker 3a and the third cell contact 105c, which is connected to the third conductive segment 107c (see FIGS. 9A, 9B, 10A, and 10B). For example, the first bypass conductor 106a can be connected to the third terminal T3 of the breaker 3a to provide a bypass path around the cell 114a. The bypass conductor 106a can be adhered to or formed with the housing body 101.

As explained above in connection with FIGS. 1A-7, the breaker 3a can comprise a switch having a normal condition and a fault condition. In the normal condition, as explained above in connection with FIGS. 1A-7, the first terminal T1 of the breaker 3a may be connected to the second terminal T2 (see FIG. 10A). In such an arrangement, where the operating current and/or temperature are within normal ranges, current is allowed to flow along the second electrical pathway P2 through the first cell 114a. For example, in the normal condition, electrons may flow along the pathway P2 from the breaker 3a (FIG. 9A) along the second segment 107b and the first cell contact 105a, through the first battery cell terminal 113a into the cell 114a, and through the second battery cell terminal 113b (FIG. 9B) and into the cell contact 105c and the third conductive segment 107c at the second end portion 112 of the housing 100.

The third cell contact 105c may serve to convey electrons from the second terminal 113b of the first cell 114a to the third conductive segment 107c. Advantageously, each of the first cell contact 105a and the third cell contact 105c may be sized so as to contact the respective terminals 113a, 113b of the battery cells without using a metal joining operation, such as welding, soldering, etc. Instead, as explained above, electrical contact between the cell contacts 105a, 105c and the cell 114a may be provided by a snap-fit connection in which the cell 114a is urged between the cell contact 105a and the cell contact 105c. It should be appreciated that, although the cell contacts 105a, 105c are illustrated as disk-shaped pieces of conductive material, in other embodiments, the cell contacts 105a, 105c can comprise elongated pieces of conductive material. Moreover, although the cell 114a may be mechanically and electrically connected to the housing 100 by a simple snap-fit connection, in some embodiments, the user may additionally or alternatively conduct a joining procedure (such as welding, soldering, etc.) to connect the terminals 113a, 113b to the cell contacts 105a, 105c, particularly for rechargeable batteries.

Thus, during normal operation of the larger system, current flows (in the opposite direction to the illustrated arrows) along the second pathway P2, i.e., through the cell 114a. However, as explained above, in some instances, the cell 114a may become overheated or too much current may flow through the cell 114a. As explained above in connection with FIGS. 1A-7, if the temperature and/or current flowing through the cell 114a exceeds various predetermined values, then the breaker 3a may enter a fault condition in which the switch 5 in the breaker moves to connect the first terminal T1 of the breaker 3a with the third terminal T3. In such a fault condition, a minority of the current may still flow between the first terminal T1 and the second terminal T2, and through the cell 114a along the second pathway P2. However, a majority (or all) of the current is shunted or bypassed around the cell 114a along the third pathway P3, which extends between the third terminal T3 of the breaker 3a and the third cell contact 105c. Shunting most or all the current around the cell 114a can prevent the cell 114a from being damaged and can extend the life of the cell 114a. Moreover, in the fault condition, the cell 114a can be bypassed without disrupting the flow of current to the second cell 114b and the larger electrical system. Advantageously, the arrangement shown in FIGS. 9A-9B can utilize a shorter electrical pathway P2 to and from the cell 114a in normal operation, and a longer bypass pathway P3 through the bypass conductor 106a in a fault condition. The longer bypass pathway P3 may have a higher resistance than the pathway P2 through the cell 114a. The relatively low resistance provided during normal operation can beneficially reduce the loss of power to heat generation.

As shown in FIG. 10B, the first bypass conductor 106a can contact the third cell contact 105c, which provides electrical communication between the first bypass conductor 106a and the third conductive segment 107c. The third conductive segment 107c can define a fourth electrical pathway P4 between the junction of the second and third pathways P2, P3 and the second breaker 3b. For example, in a normal condition, current can flow along the second pathway P2 through the cell 114a and along the fourth pathway P4 and the third segment 107c to the second breaker 3b. In a fault condition, most or all of the current ($I_2$ in FIG. 1B) can flow along the third pathway P3 and the first bypass conductor 106a to the third cell contact 105c and third segment 107c, and a minority of the current ($I_3$ in FIG. 1B) can flow along the second pathway P2 to the third cell contact 105c and third segment 107c. The combined current ($I_1$ in FIG. 1B) can flow along the third segment 107c and the fourth pathway P4 to the breaker 3b.

As with the first breaker 3a, the second breaker 3b has a normal operating condition and a fault condition. In a normal condition, the third segment 107c is connected to the first terminal T1 of the breaker 3b, which is in turn connected to the second terminal T2 of the breaker 3b. The second terminal T2 of the breaker 3b can be connected with the fourth conductive segment 107d, the fourth cell contact 105d, and the first battery cell terminal 113a of the second cell 114b (see FIG. 10B). Thus, in the normal condition, the current flows through the breaker 3b along a fifth pathway P5 through the second cell 114b between the fourth cell contact 105d and the second cell contact 105b (see FIG. 9B).

In a fault condition (such as an overtemperature and/or overcurrent fault), the switch of the breaker 3b can move to connect the first terminal T1 with the third terminal T3, which can be connected with a first end of the second bypass conductor 106b. As with the first breaker 3a, if the second cell 114b is in a fault condition, a majority of the current flows through the bypass conductor 106b along a sixth electrical pathway P6, and a minority of the current flows through the cell 114b along the fifth electrical pathway P5. As noted previously, the arrowheads in the drawings illustrate the direction of electron flow (assuming 113a is positive and 113b is negative), such that the current flows in the opposite direction to the illustrated arrowheads.

As shown in FIGS. 9A, 10A, and 11B, a second end of the second bypass conductor 106b can be connected to the fifth electrical segment 107e. In addition, the second cell contact 105b can be connected to the fifth electrical segment 107e. Current flowing along the fifth and/or sixth pathways P5, P6 can flow along a seventh electrical pathway P7 through the fifth segment 107e and the sixth segment 107f to the second modular battery terminal 104b. The second modular battery terminal 104b can be formed on an exterior surface of the housing 100, e.g., on the exterior surface of the second wall 110b. The second modular battery terminal 104b can be configured to provide electrical communication with another external component, such as another battery housing or an electrical load. As shown in FIGS. 11A-11B, a channel 116 can be defined along a portion of the housing walls 110 and can be sized and shaped to receive the sixth segment 107f.

Figure 12:
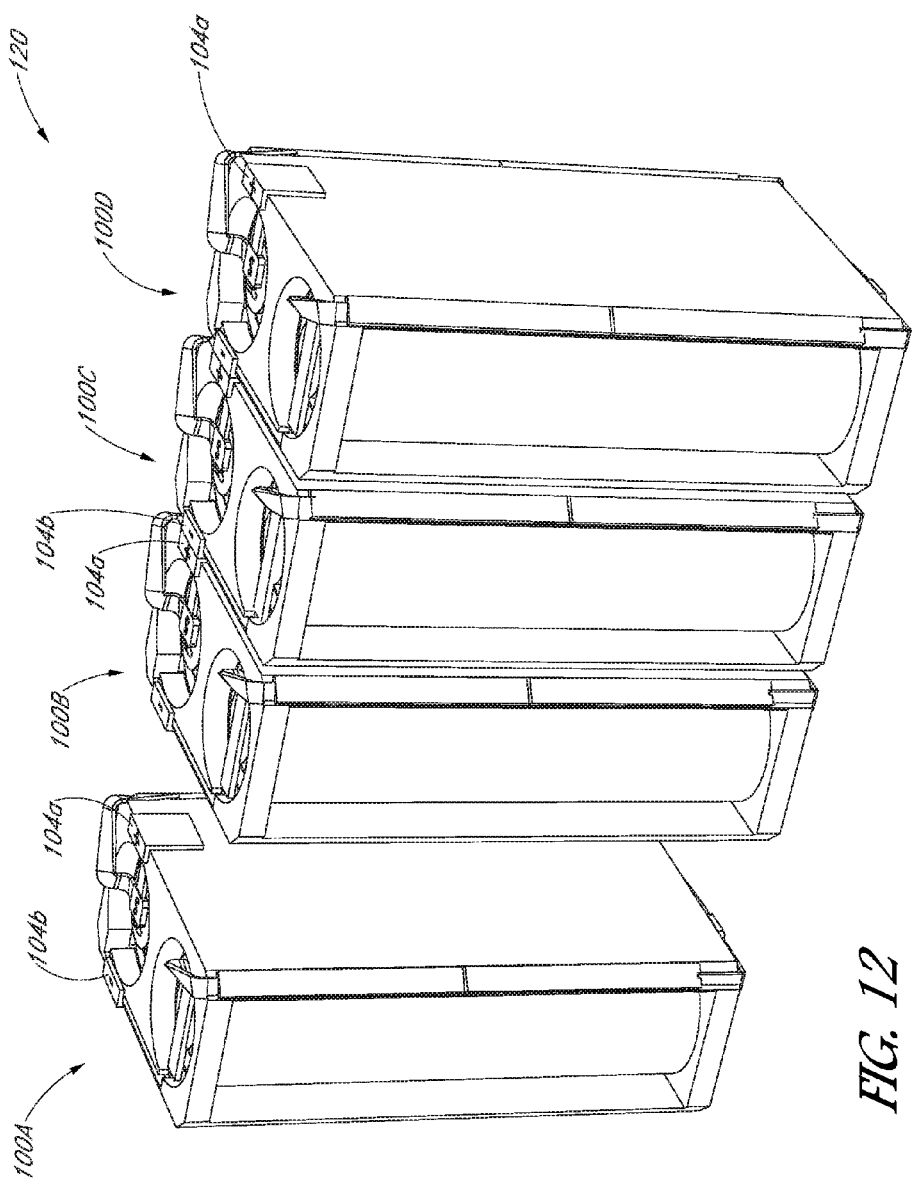
FIG. 12 is a rear and right perspective view of a string of modular battery housings connected together, according to various embodiments.

FIG. 12 is a rear right perspective view of a battery pack comprising a string 120 of battery housings 100A-100D connected together, according to various embodiments. Advantageously, the battery housing 100 shown in FIGS.

9A-11B can provide a modular platform by which numerous battery housings can be electrically and mechanically connected together. The use of numerous battery housings connected together in a modular arrangement can beneficially enable the use of high voltage power supplies for high power applications, such as automotive applications (cells for electric vehicles such as cars, scooters or bicycles), computing applications (laptop computers, mobile smartphones, tablets, etc.), medical devices, etc. Moreover, by incorporating one or more breakers 3 into each housing 100A-100D, the battery pack can continue to deliver current for device operation even if one or more of the battery cells is bypassed due to a fault condition, and the user can replace a defective battery cell by simply removing the battery cell from the battery housing and snapping in a replacement battery cell, without disrupting the supply of current to the electrical load.

As shown in FIG. 12, the first modular battery contact 104a of the first housing 100A can electrically connect to the second modular battery contact 104b of the second housing 100B, the first modular battery contact 104a of the second housing 100B can electrically connect to the second modular battery contact 104b of the third housing 100C, and the first modular battery contact 104a of the third housing 100C can electrically connect to the second modular battery contact 104a of the fourth housing 100D. The connection between the respective first and second modular battery contact 104a, 104b of adjacent housings can be made without the use of metal joining processes. For example, in some embodiments, the modular battery contacts 104a, 104b of adjacent housings can snap together to provide electrical and mechanical connection between adjacent housings. In some embodiments, the modular battery contacts 104a, 104b of adjacent battery housings can interlock in a sliding connection to provide electrical and mechanical connection between adjacent housings. In some embodiments, the user may elect to weld or solder the modular battery contacts 104a, 104b of adjacent housings together. In various embodiments, the housing body 101 of each housing 100A-100D can comprise various mechanical locking features to provide mechanical engagement between adjacent battery housings. Although four housings 100A-100D are illustrated in FIG. 12, it should be appreciated that any suitable number of battery housings can be connected to one another. When the string 120 is assembled, the outermost electrical modular battery contacts (e.g., the second modular battery contact 104b of the housing 100A and the first modular battery contact 104a of the housing 100D in FIG. 12) can electrically connect to the desired electrical load (e.g., motor) to provide power thereto.

Figure 13A:
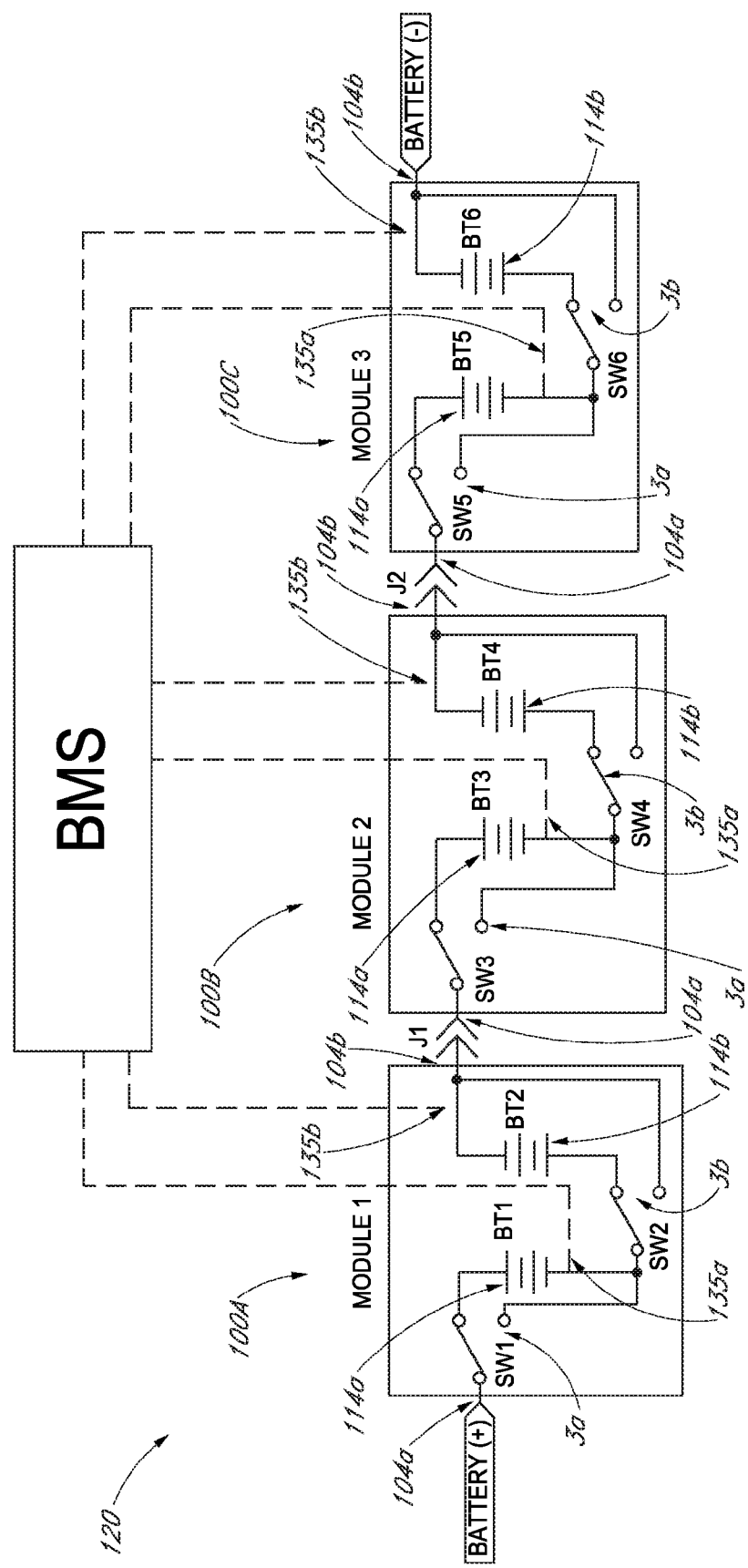
FIG. 13A is a schematic circuit diagram of a string of battery housings connected in series, according to various embodiments.

FIG. 13A is a schematic circuit diagram of a battery pack comprising a string 120 of battery housings 100A-100C connected in series, according to various embodiments. Unless otherwise noted, reference numerals shown in FIG. 13A represent the same or similar components as those shown in FIGS. 1A-12. As explained herein, multiple battery housings 100A-100C can be connected together in series. Connecting the housings 100A-100C together in series can advantageously increase the total amount of electrical energy available for supplying to the electrical load. For example, three housings 100A-100C are shown in FIG. 13A, with each housing 100A-100C comprising two cells 114a, 114b. If each cell 114a, 114b has a voltage of V, then the string 120 of six battery cells connected in series as shown supplies a voltage of 6V. The modularity of the housing enables the use of numerous batteries for applications with high power requirements. If one of the battery cells fails, then the associated breaker 3a, 3b can advantageously route the majority of the current around the failed battery cell to provide power to the larger system. The snap-fit connection of the housings 100A-100C enables the user to easily remove and replace the failed battery cell. Moreover, as shown in FIG. 13A, the battery management system (BMS) can connect to respective first and second connectors 135a, 135b which are electrically coupled with selected terminals (e.g., negative terminals) of the battery cells. As explained herein, the BMS can monitor the voltage of each battery cell and can alert the user if the voltage of a particular cell rises or falls to undesirable levels. For example, in some embodiments, the BMS can determine if one or more battery cells has been bypassed due to, e.g., the switch being in a fault condition.

Figure 13B:
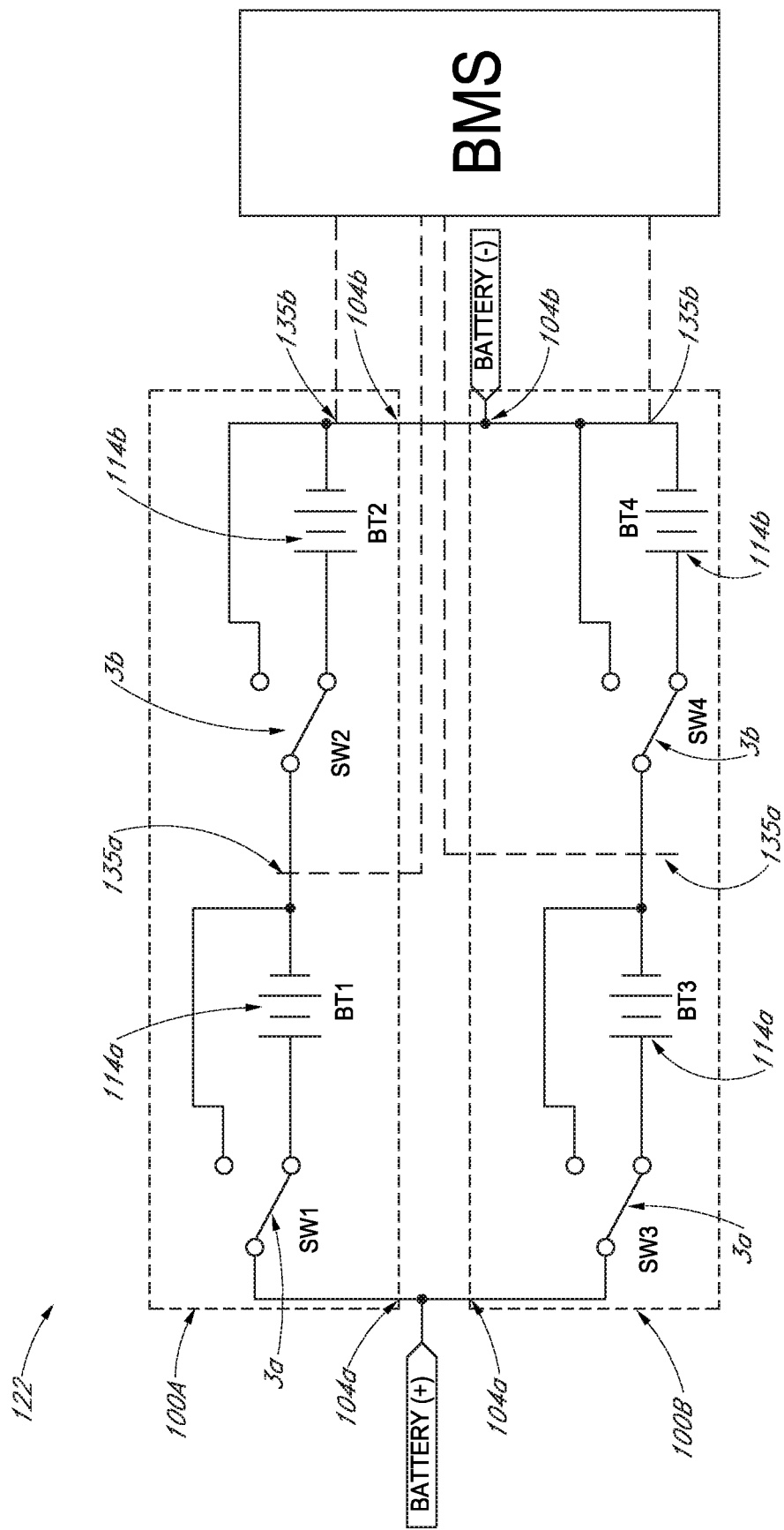
FIG. 13B is a schematic circuit diagram of battery housings with two battery housings connected in parallel, according to various embodiments.

FIG. 13B is a schematic circuit diagram of a battery pack comprising a group 122 of battery housings 100A-100B connected in parallel, according to various embodiments. Unless otherwise noted, reference numerals shown in FIG. 13B represent the same or similar components as those shown in FIGS. 1A-12. Unlike the embodiment of FIG. 13A, in FIG. 13B, two battery housings 100A and 100B are connected in parallel. If one of the battery cells from the first housing 100A fails (e.g., cell 114a), then the breaker 3a can bypass the cell 114a and supply current to the second cell 114b and the larger electrical system. In addition, as with FIG. 13A, the BMS can electrically connect to respective first and second connectors 135a, 135b to monitor the voltage of each battery cell, as explained above.

One challenge with the arrangement shown in FIG. 13B is that, if one cell fails and is bypassed by the breaker, then the resulting arrangement would include one cell in parallel with two cells. The resulting imbalance in voltage across the two strings may damage the cell which remains operational, and/or may reduce the performance of the larger electrical system. In some embodiments, such a voltage imbalance may be addressed by providing a diode (e.g., a Schottky-type diode) in each parallel string to prevent reverse biasing through the cells. In some embodiments, the potential voltage imbalance may be addressed by providing a transistor in each string (e.g., a p-channel MOSFET), which can act similar to a diode to prevent or reduce reverse biasing through the cells.

Figure 14:
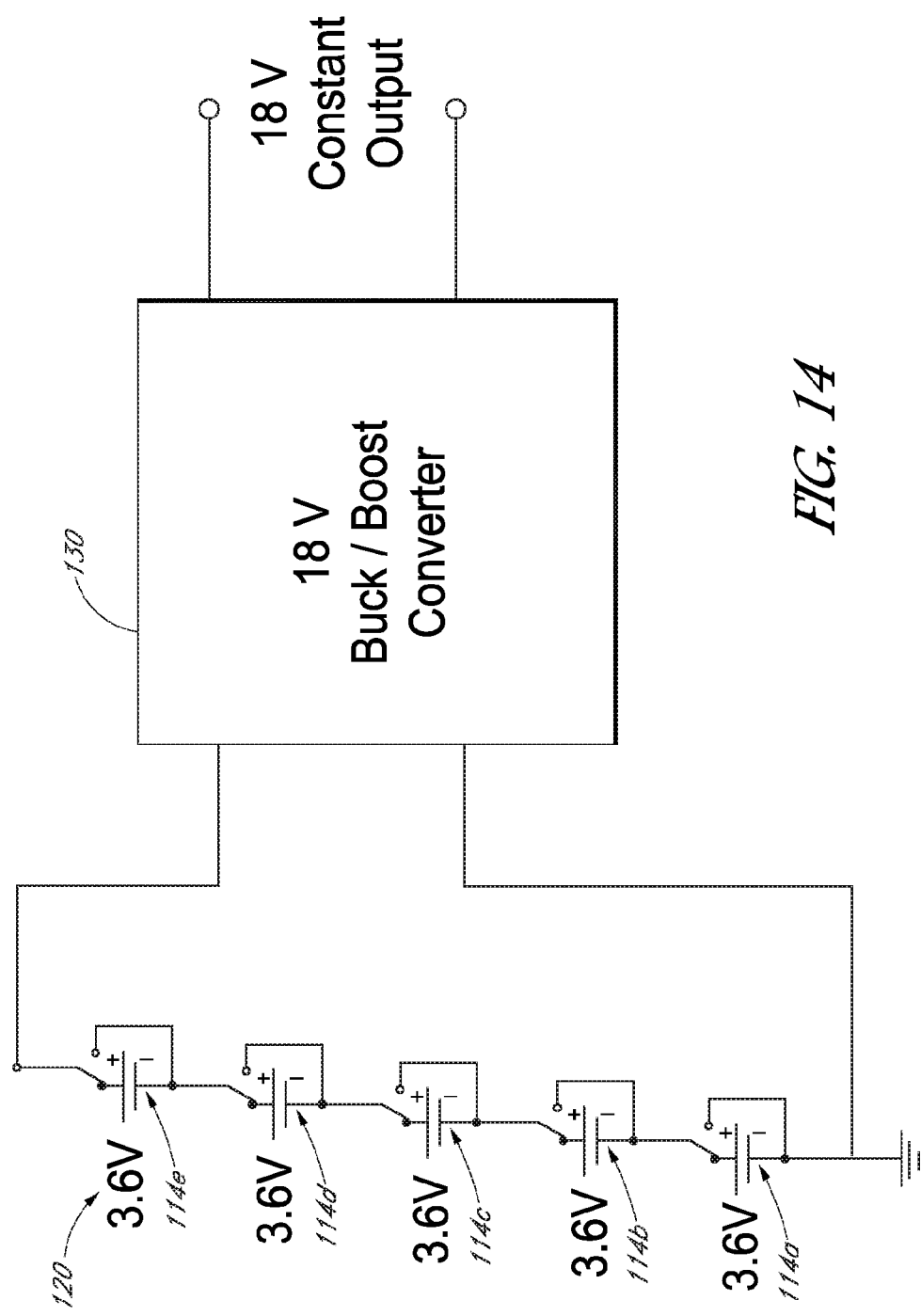
FIG. 14 is a schematic system diagram of a battery pack comprising a string of cells connected in series with one another and with a buck-boost converter.

FIG. 14 is a schematic system diagram of a battery pack comprising a string 120 of cells 114a-114e connected in series with one another and with a buck-boost converter 130. The cells 114a-114e can be coupled with any of the battery housings 100 disclosed herein, or can be connected together in any other suitable manner. The buck-boost converter 130 can comprise a DC-to-DC conversion structure which maintains the output voltage of the string 120 within an acceptable voltage range. For example, if one of the cells 114a-114e is bypassed from the string by the breaker, then the overall voltage of the string 120 would drop by an amount equal to the voltage supplied by the bypassed cell. The buck-boost converter 130 can advantageously maintain the output of the string 120 within a desired voltage range. For example, as shown in FIG. 14, if each cell 114a-114e supplies a voltage of 3.6V, then the string 120 would normally supply 18V total. If one of the cells is bypassed, then the supplied voltage would drop to 14.4V total. The buck-boost converter 130 can maintain the total output of the string 120 at 18V, even if one or more cells is bypassed.

As explained herein, when one or more cells is bypassed by the breaker due to a fault condition, the bypassed cell does not interrupt the current supplied to the other cells and the electrical load. When the overcurrent and/or overtemperature fault condition subsides, the breaker can reset and return to the normal operational condition, as explained above in connection with FIGS. 1A-7. Moreover, the user can easily remove and replace the bypassed and damaged cell with a new cell using a simple snap-fit connection that provides electrical and mechanical connection of the new cell with the housing. In various embodiments, an electrical battery monitoring system can be provided which determines whether a cell is bypassed during use. The battery monitoring system can send a signal to the user to alert the user that one or more cells should be replaced. To facilitate the use of a battery monitoring or management system (BMS), terminals or contact points can be incorporated into the modular battery housing which facilitate the connection of the BMS to a point in the circuit between each of the cells. The use of the breakers disclosed herein can be integrated into the housing for a battery or battery pack to automatically monitor overtemperature and/or overcurrent fault conditions can beneficially reduce the costs for providing breakers at the housing level, rather than within the battery cells themselves. Eliminating breakers for each cell can reduce the overall costs of the system while increasing safety of the system relative to omitting breakers. Moreover, utilizing the breakers disclosed herein can also reduce the need for costly thermal management systems, such as liquid cooling systems. In some embodiments, one or more heating elements, for example PPTC elements, may be incorporated into the housing to improve the performance of the battery, especially in cold environments.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An electrical breaker responsive to a fault condition, the breaker comprising:
    a first terminal;
    a second terminal;
    a third terminal; and
    a thermally-activated switch disposed between the first terminal and the second and third terminals, wherein the switch has a normal operating condition in which the first terminal is electrically connected to the second terminal, and the switch has a fault condition in which the first terminal is electrically connected to both the second terminal and to the third terminal, such that in a fault condition, a majority of the current flows between the first terminal and the third terminal and a minority of the current flows between the first terminal and the second terminal.

2. The breaker of claim 1, further comprising a positive temperature coefficient (PTC) resistor between the first terminal and the second terminal.

3. The breaker of claim 2, wherein the thermally-activated switch comprises a bimetal switching element in contact with the PTC resistor.

4. The breaker of claim 3, wherein the bimetal switching element is dome-shaped.

5. The breaker of claim 3, wherein the thermally-activated switch comprises a movable arm electrically connected to the first terminal and to the bimetal switching element.

6. The breaker of claim 5, wherein the movable arm is electrically connected to the second terminal when the switch is in the normal operating condition.

7. The breaker of claim 6, wherein the bimetal switching element inverts in shape as the switch moves from the normal operating condition to the fault condition.

8. The breaker of claim 7, wherein inversion of the bimetal switching element causes the movable arm to pivot or bend to electrically connect to the third terminal.

9. The breaker of claim 1, wherein the switch is configured to move from the normal operating condition to the fault condition when a temperature of the thermally-activated switch rises above a first threshold temperature.

10. The breaker of claim 9, wherein the switch is configured to return to the normal operating condition from the fault condition when the temperature of the thermally-activated switch falls below a second threshold temperature, the second threshold temperature lower than the first threshold temperature.

11. The breaker of claim 9, wherein the first threshold temperature is in a range of 65° C. to 85° C.

12. The breaker of claim 11, wherein the first threshold temperature is in a range of 70° C. to 80° C.

13. The breaker of claim 10, wherein the second threshold temperature is in a range of 30° C. to 60° C.

14. The breaker of claim 13, wherein the second threshold temperature is in a range of 40° C. to 55° C.

15. The breaker of claim 1, wherein the switch is configured such that, after the switch moves from the normal operating condition to the fault condition, the switch does not automatically move back to the normal operating condition.

16. The breaker of claim 2, wherein the PTC resistor is disposed between the first terminal and the second terminal.

17. The breaker of claim 2, wherein the PTC resistor comprises a ceramic PTC resistor.

18. A device comprising:
    a plurality of cells for a battery connected to one another in series, each cell of the plurality of cells having a first battery cell terminal and a second battery cell terminal; and
    an electrical breaker connected to the first battery cell terminal of a selected cell of the plurality of cells, the electrical breaker comprising:
        a first terminal;
        a second terminal;
        a third terminal; and
        a switch disposed between the first terminal and the second and third terminals, wherein the switch has a normal operating condition in which the first terminal is electrically connected to the second terminal, and the switch has a fault condition in which the first terminal is electrically connected to both the second terminal and the third terminal; and
        a bypass circuit electrically connecting the third terminal with the second battery cell terminal of the selected cell, such that in a fault condition, a majority of the current flows between the first terminal and the third terminal to provide a shunt around the selected cell, and a minority of the current flows between the first terminal and the second terminal.

19. The device of claim 18, further comprising a positive temperature coefficient (PTC) resistor between the first terminal and the second terminal.

20. The device of claim 18, wherein the switch comprises a thermally-activated switch.

21. The device of claim 20, wherein the thermally-activated switch comprises a bimetal switching element.

22. The device of claim 18, wherein the switch is configured to move from the normal operating condition to the fault condition when a temperature of the thermally-activated switch rises above a first threshold temperature.

23. The device of claim 22, wherein the switch is configured to return to the normal operating condition from the fault condition when the temperature of the thermally-activated switch falls below a second threshold temperature, the second threshold temperature lower than the first threshold temperature.

24. The device of claim 22, wherein the first threshold temperature is in a range of 65° C. to 85° C.

25. The device of claim 24, wherein the first threshold temperature is in a range of 70° C. to 80° C.

26. The device of claim 23, wherein the second threshold temperature is in a range of 30° C. to 60° C.

27. The device of claim 26, wherein the second threshold temperature is in a range of 40° C. to 55° C.

28. The device of claim 18, wherein the switch is configured such that, after the switch moves from the normal operating condition to the fault condition, the switch cannot move back to the normal operating condition.

29. The device of claim 18, further comprising a battery housing sized and shaped to receive one or more cells for a battery, the electrical breaker integrated with the battery housing.

* * * * *